(12) United States Patent
Franklin et al.

(10) Patent No.: US 10,940,641 B2
(45) Date of Patent: Mar. 9, 2021

(54) MULTI-LIGHT BEAM ENERGY DELIVERY WITH ROTATING POLYGON FOR ADDITIVE MANUFACTURING

(71) Applicant: Applied Materials, Inc., Santa Clara, CA (US)

(72) Inventors: Jeffrey L. Franklin, Santa Cruz, CA (US); Hou T. Ng, Campbell, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 228 days.

(21) Appl. No.: 15/960,478

(22) Filed: Apr. 23, 2018

(65) Prior Publication Data
US 2018/0339454 A1 Nov. 29, 2018

Related U.S. Application Data

(60) Provisional application No. 62/511,864, filed on May 26, 2017.

(51) Int. Cl.
*G02B 5/09* (2006.01)
*G02B 26/12* (2006.01)
(Continued)

(52) U.S. Cl.
CPC .......... *B29C 64/268* (2017.08); *B29C 64/153* (2017.08); *B29C 64/205* (2017.08);
(Continued)

(58) Field of Classification Search
CPC ........... B22F 2003/1056; B29C 64/205; B29C 64/209; B29C 64/214; B29C 64/218;
(Continued)

(56) References Cited

U.S. PATENT DOCUMENTS 4,616,132 A * 10/1986 Kessler .............. G06K 15/1219
250/236
4,643,569 A 2/1987 Sullivan et al.
(Continued)

FOREIGN PATENT DOCUMENTS

EP 2926925 10/2015
JP H01-316415 12/1989
(Continued)

OTHER PUBLICATIONS

International Search Report and Written Opinion in International Application No. PCT/US2018/034337, dated Sep. 21, 2018, 12 pages.

(Continued)

*Primary Examiner* — Leo B Tentoni
(74) *Attorney, Agent, or Firm* — Fish & Richardson P.C.

(57) ABSTRACT

An additive manufacturing apparatus includes a platform, a dispenser to dispense a plurality of layers of feed material on a top surface of the platform, and an energy delivery system. The energy delivery system has one or more light sources configured to emit a first light beam and a second light beam, and one or more reflective members each having reflective facets to redirect the first light beam or the second light beam toward an uppermost layer of feed material to deliver energy to the uppermost layer. The one or more reflective members are each rotatable such that motion of each sequential facet of the reflective facets of each of the one or more reflective members sweeps the first light beam along a first path on the uppermost layer or sweeps the second light beam along a second path on the uppermost layer.

19 Claims, 16 Drawing Sheets

(51) Int. Cl.
| | |
|---|---|
| *B29C 64/268* | (2017.01) |
| *B29C 64/218* | (2017.01) |
| *B29C 64/209* | (2017.01) |
| *B29C 64/214* | (2017.01) |
| *B29C 64/277* | (2017.01) |
| *B33Y 10/00* | (2015.01) |
| *B33Y 30/00* | (2015.01) |
| *B29C 64/153* | (2017.01) |
| *B29C 64/245* | (2017.01) |
| *B29C 64/205* | (2017.01) |
| *B22F 3/105* | (2006.01) |

(52) U.S. Cl.
CPC .......... *B29C 64/209* (2017.08); *B29C 64/214* (2017.08); *B29C 64/218* (2017.08); *B29C 64/245* (2017.08); *B29C 64/277* (2017.08); *B33Y 10/00* (2014.12); *B33Y 30/00* (2014.12); *G02B 26/123* (2013.01); *B22F 2003/1056* (2013.01)

(58) Field of Classification Search
CPC ... B29C 64/245; B29C 64/268; B29C 64/277; B33Y 30/00; G02B 5/09; G02B 26/12; G02B 26/123
USPC .......... 425/78, 174.4, 375, 470; 219/121.65, 219/121.76, 121.77; 359/216.1, 217.1, 359/218.1, 219.1
See application file for complete search history.

(56) References Cited

U.S. PATENT DOCUMENTS

| | | | |
|---|---|---|---|
| 6,359,255 | B1 | 3/2002 | Yamamoto et al. |
| 8,784,720 | B2 | 7/2014 | Oberhofer et al. |
| 8,967,990 | B2 | 3/2015 | Weidinger et al. |
| 9,073,260 | B2 | 7/2015 | El-Siblani et al. |
| 9,073,261 | B2 | 7/2015 | El-Siblani et al. |
| 9,073,262 | B2 | 7/2015 | El-Siblani et al. |
| 9,079,355 | B2 | 7/2015 | El-Siblani et al. |
| 9,415,443 | B2 | 8/2016 | Ljungblad et al. |
| 2003/0052105 | A1 | 3/2003 | Nagano et al. |
| 2006/0215246 | A1 | 9/2006 | Kerekes et al. |
| 2013/0001834 | A1 | 1/2013 | El-Siblani et al. |
| 2013/0189435 | A1 | 7/2013 | Mackie et al. |
| 2014/0271328 | A1 | 9/2014 | Burris et al. |
| 2015/0102531 | A1 | 4/2015 | El-Siblani et al. |
| 2015/0283761 | A1 | 10/2015 | Maeda et al. |
| 2016/0045989 | A1* | 2/2016 | Bruck .................... B23K 26/34 219/76.1 |
| 2016/0114432 | A1 | 4/2016 | Ferrar et al. |
| 2017/0021419 | A1 | 1/2017 | Ng et al. |
| 2017/0021454 | A1 | 1/2017 | Dallarosa et al. |
| 2017/0021455 | A1 | 1/2017 | Dallarosa et al. |
| 2017/0036404 | A1 | 2/2017 | Rengers et al. |
| 2017/0144254 | A1 | 5/2017 | Buller et al. |
| 2017/0165751 | A1 | 6/2017 | Buller et al. |
| 2017/0330370 | A1 | 11/2017 | Kim et al. |
| 2018/0257299 | A1 | 9/2018 | Ng et al. |
| 2018/0257300 | A1 | 9/2018 | Ng et al. |
| 2018/0257301 | A1 | 9/2018 | Ng et al. |
| 2018/0339450 | A1 | 11/2018 | Franklin et al. |
| 2018/0369914 | A1 | 12/2018 | Ishikawa et al. |
| 2018/0369960 | A1 | 12/2018 | Ishikawa et al. |

FOREIGN PATENT DOCUMENTS

| | | |
|---|---|---|
| JP | H03-32481 | 2/1991 |
| JP | 11-033752 A | 2/1999 |
| JP | 2009-006509 | 1/2009 |
| KR | 10-2003-0090042 | 11/2003 |
| KR | 10-2006-0012398 | 2/2006 |
| KR | 10-1612254 | 4/2016 |
| KR | 10-2016-0057568 | 5/2016 |
| KR | 10-2016-0109866 | 9/2016 |
| KR | 10-1682087 | 12/2016 |
| WO | WO 2009/026520 | 2/2009 |
| WO | WO 2016/026706 | 2/2016 |
| WO | WO 2016/051163 | 4/2016 |

OTHER PUBLICATIONS

International Search Report and Written Opinion in International Application No. PCT/US2018/034325, dated Sep. 21, 2018, 14 pages.

* cited by examiner

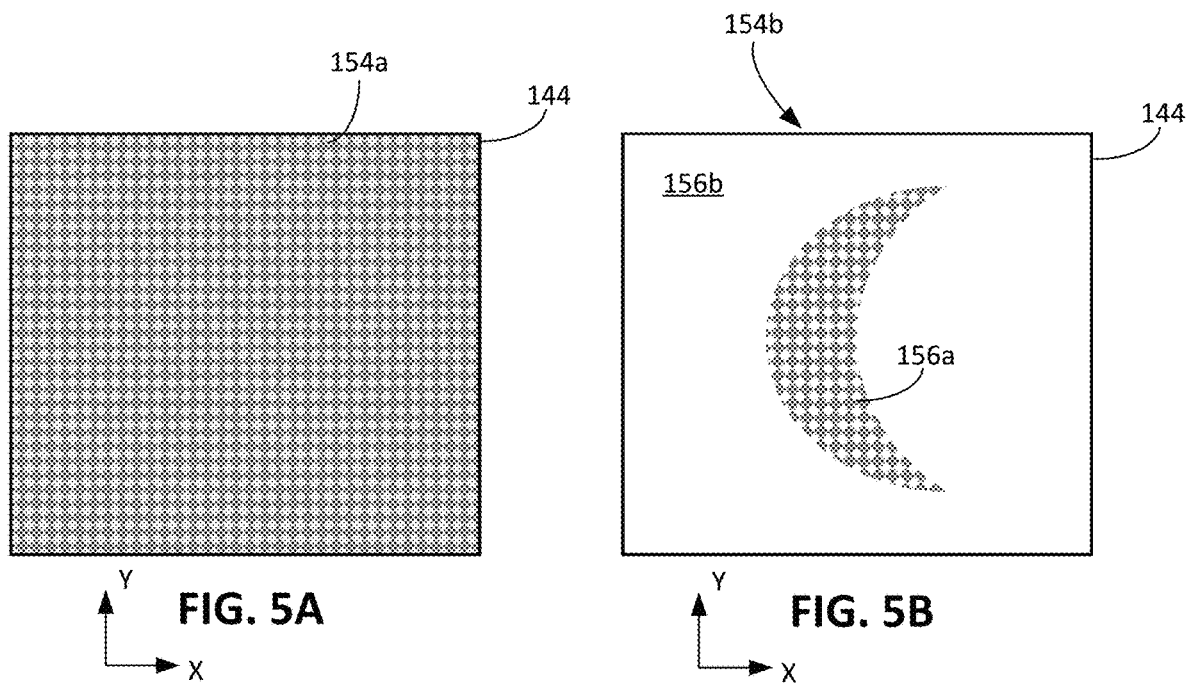

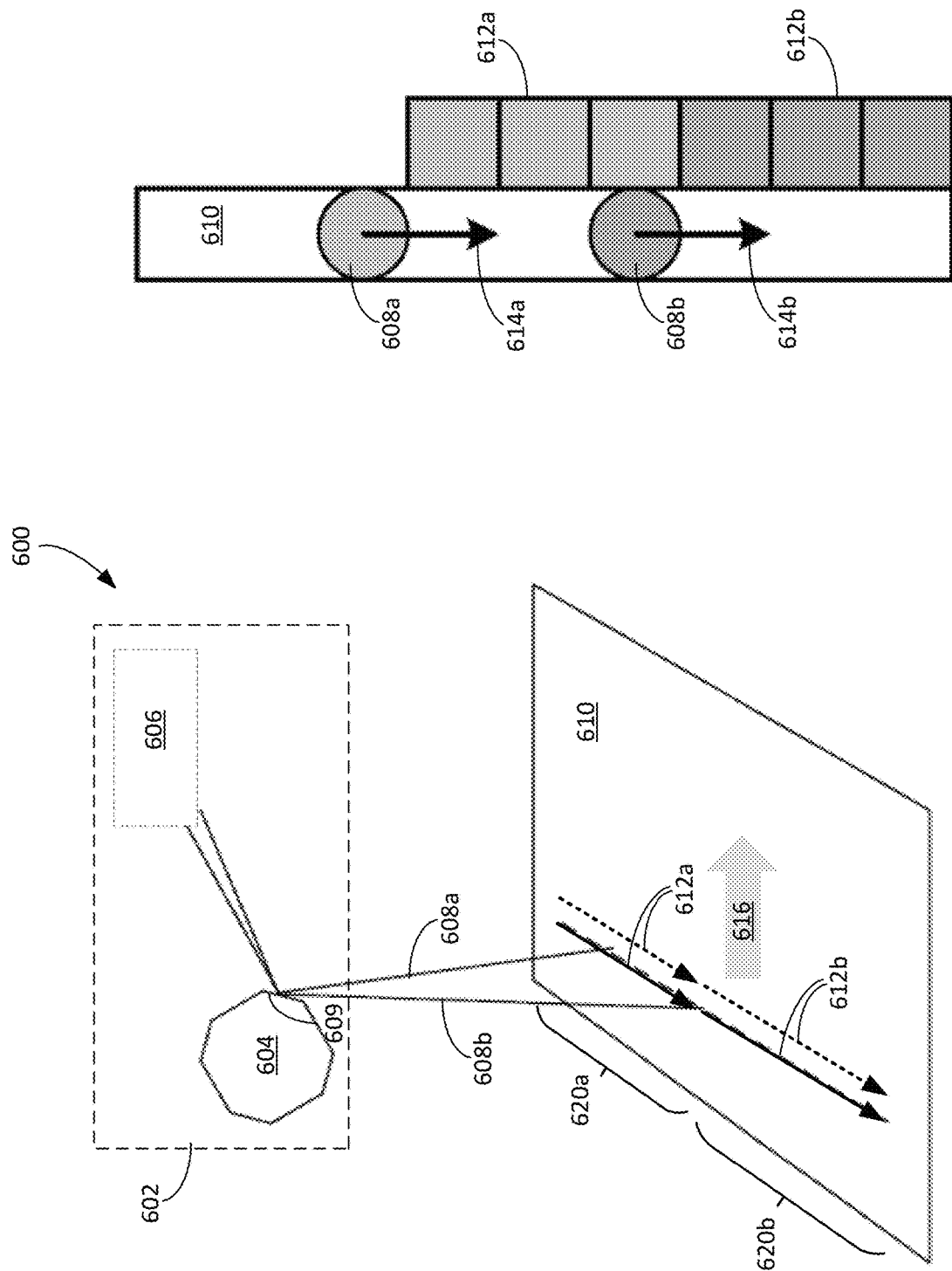

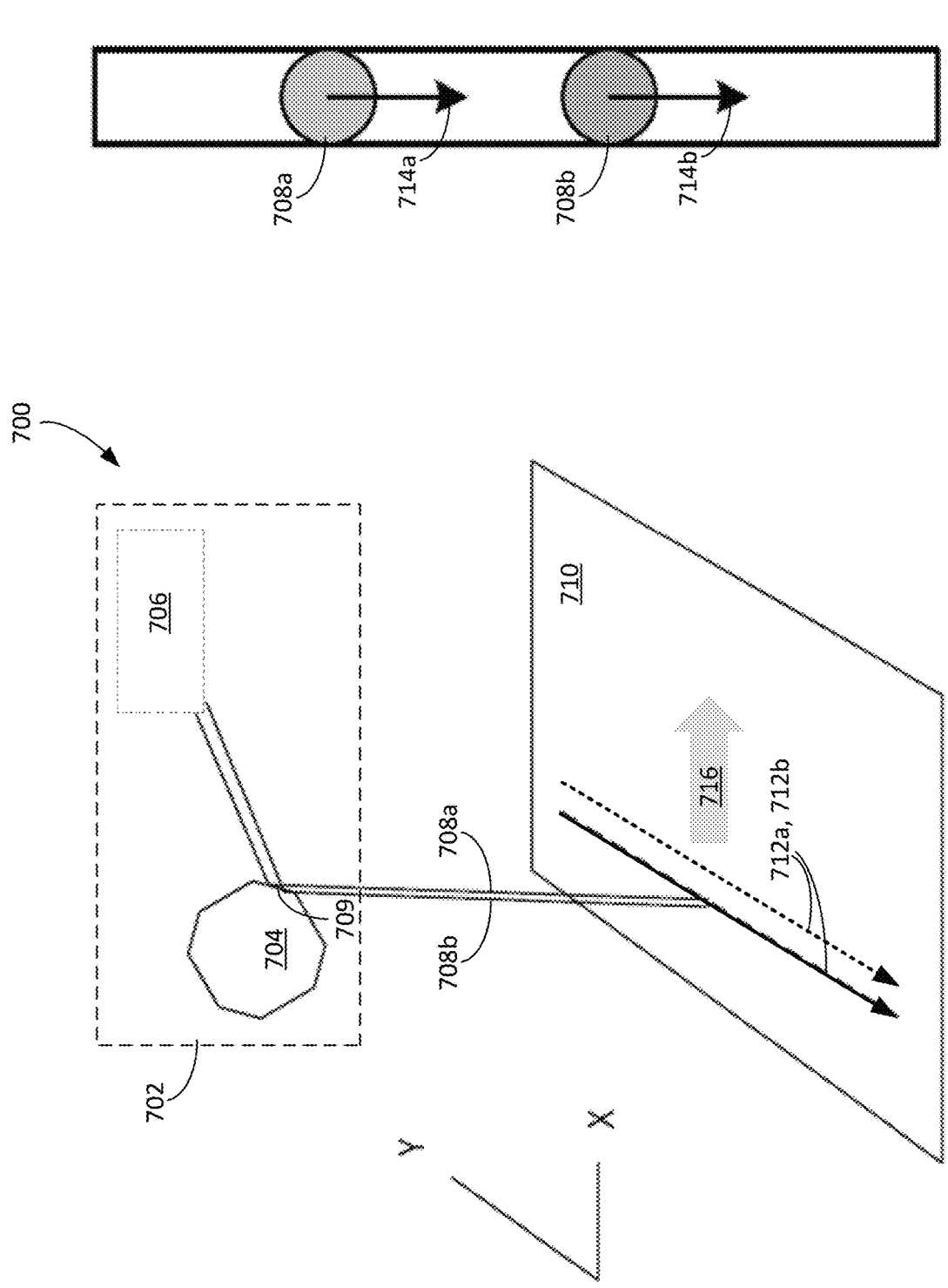

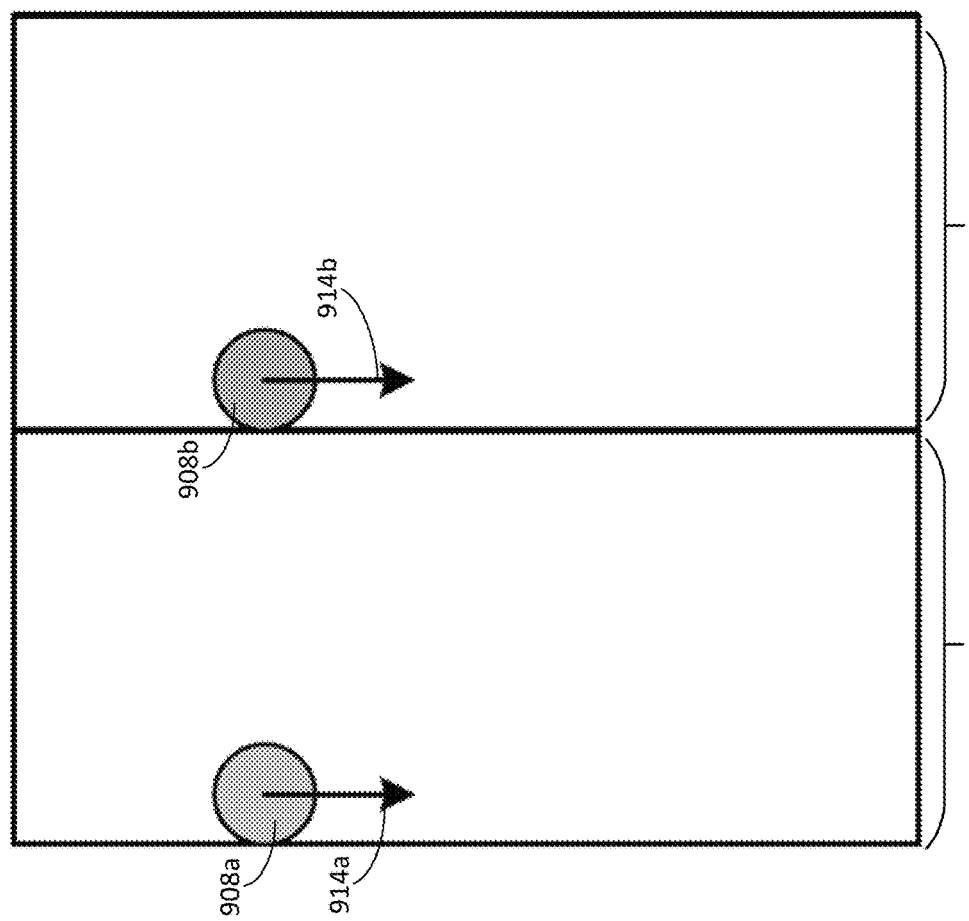
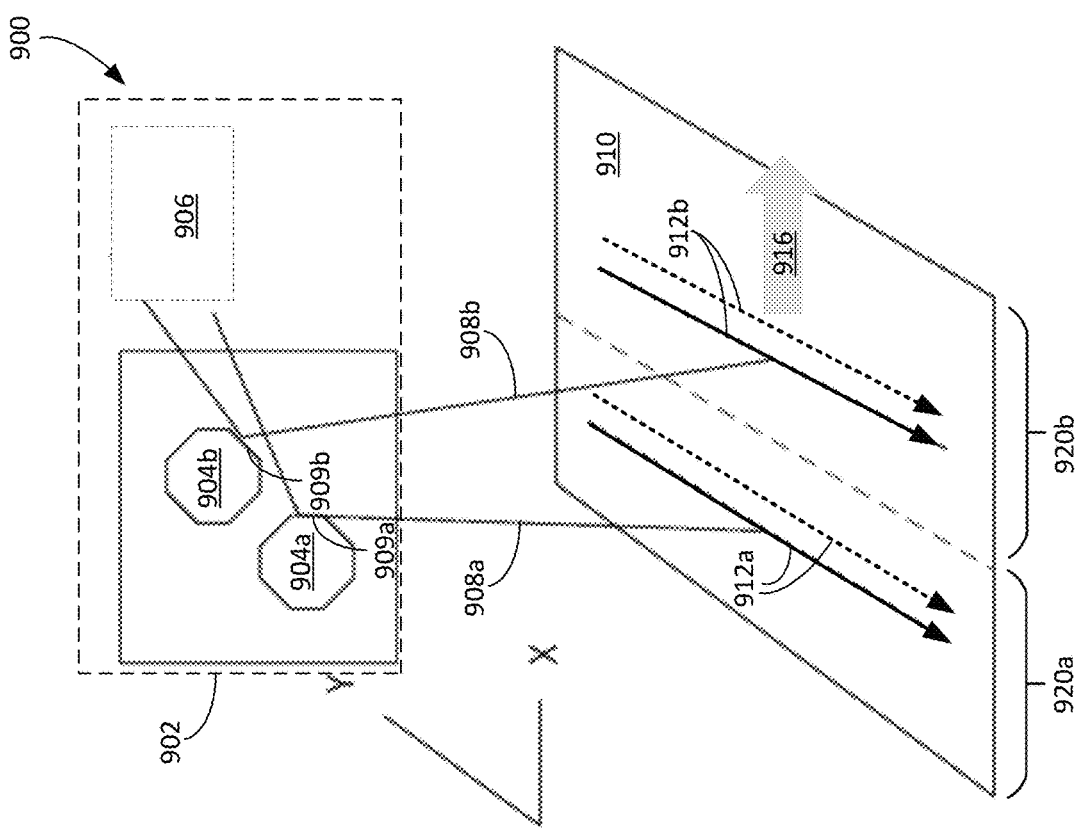
FIG. 12B
FIG. 12A

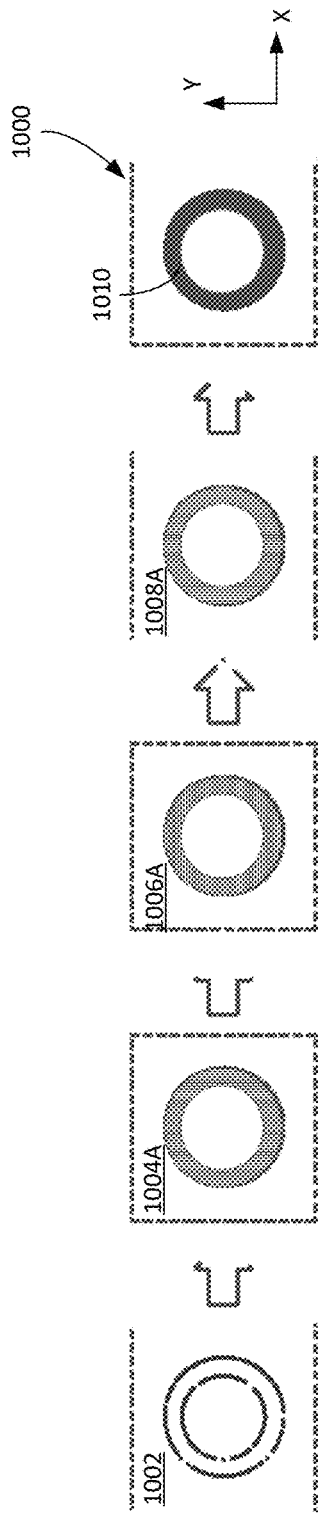
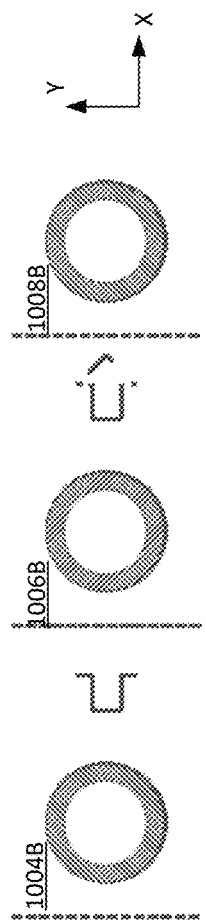
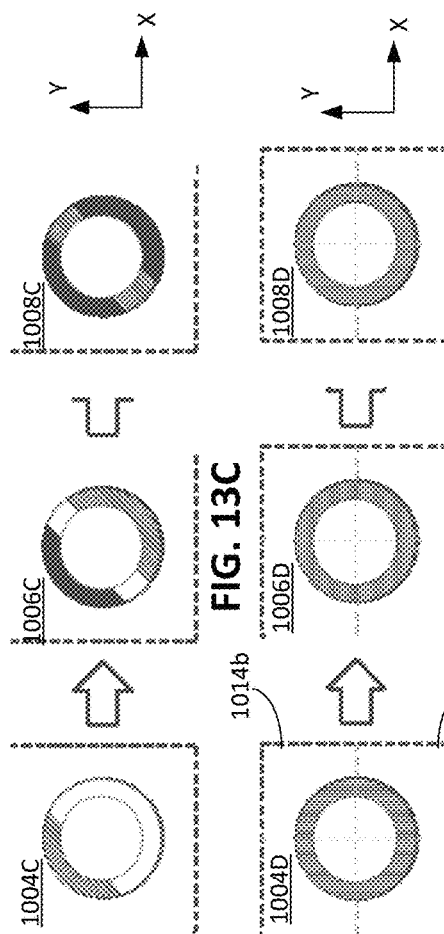
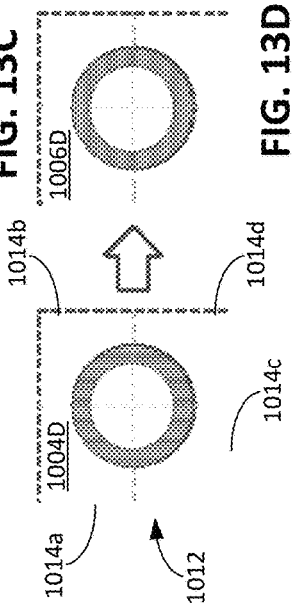
FIG. 13A
FIG. 13B
FIG. 13C
FIG. 13D

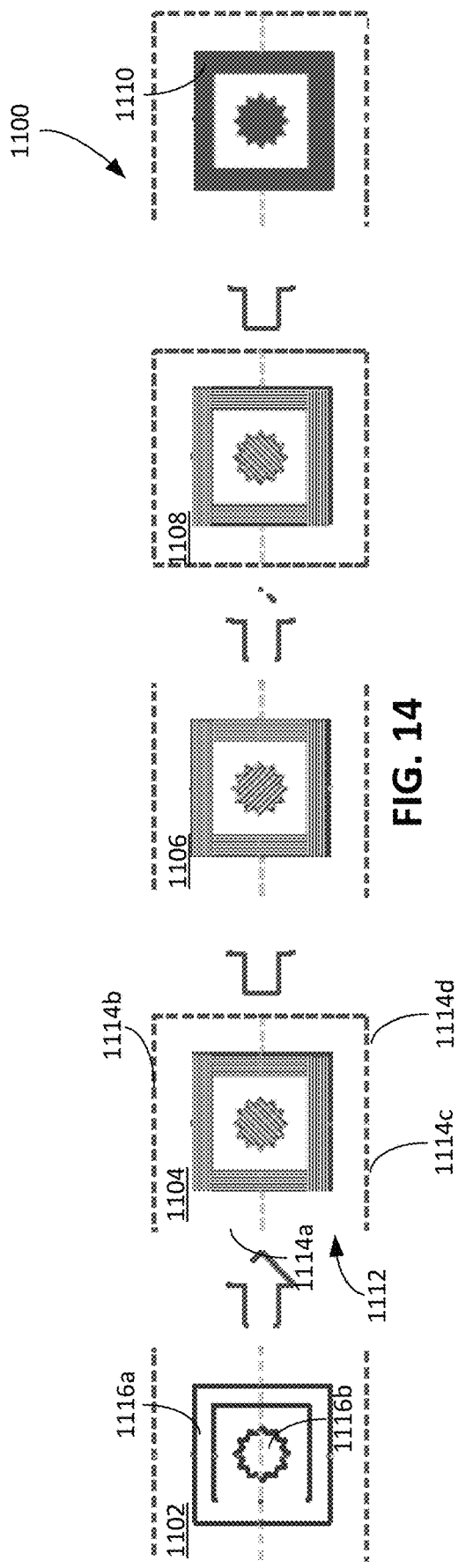

MULTI-LIGHT BEAM ENERGY DELIVERY WITH ROTATING POLYGON FOR ADDITIVE MANUFACTURING

CROSS-REFERENCE TO RELATED APPLICATIONS

This application claims priority to U.S. Application Ser. No. 62/511,864, filed on May 26, 2017, the entire disclosure of which is incorporated by reference.

TECHNICAL FIELD

This specification relates to an energy delivery system for additive manufacturing, also known as 3D printing.

BACKGROUND

Additive manufacturing, also known as solid freeform fabrication or 3D printing, refers to a manufacturing process where three-dimensional objects are built up from successive dispensing of raw feed material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften dispensed feed material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the feed material that are compatible for use in the processes.

Conventional systems use an energy source for sintering or melting a powdered material. Once all the selected locations on the first layer are sintered or melted and then re-solidified, a new layer of powdered material is deposited on top of the completed layer, and the process of dispensing and sintering or melting is repeated layer by layer until the desired object is produced.

SUMMARY

In one aspect, an additive manufacturing apparatus includes a platform, a dispenser to dispense a plurality of layers of feed material on a top surface of the platform, and an energy delivery system. The energy delivery system has one or more light sources configured to emit a first light beam and a second light beam, and one or more reflective members each having reflective facets to redirect the first light beam or the second light beam toward an uppermost layer of feed material to deliver energy to the uppermost layer. The one or more reflective members are each rotatable such that motion of each sequential facet of the reflective facets of each of the one or more reflective members sweeps the first light beam along a first path on the uppermost layer or sweeps the second light beam along a second path on the uppermost layer.

Implementations may include one or more of the following features.

The first path of the first light beam may be parallel to the second path of the second light beam. The first path and the second path may be collinear. The first path and the second path may be overlapping.

The one or more reflective members may include a common reflective member to receive the first light beam and the second light beam, the reflective member being rotatable such that motion of each sequential facet of reflective facets of the reflective member sweeps the first light beam along the first path and sweeps the second light beam along the second path. For each sequential facet of the common reflective member, the first light beam may be received at a sequential facet when the second light beam is received at the sequential facet. The first light beam may be received at a first reflective facet when the second light beam may be received at a second reflective facet. The first path and the second path may each extend along an entire width of the uppermost layer of feed material. The first path may extends along a first portion of a width of the uppermost layer of feed material and the second path may extends along a second portion of the width of the uppermost layer of feed material. The first path may overlap the second path by 5% to 15% of a length of the first path.

The one or more light sources may be arranged relative to the one or more reflective members such that the one or more reflective members receive the first light beam at a first angle of incidence and receive the second light beam at a different second angle of incidence. The one or more light sources may arranged relative to the one or more reflective members such that the one or more reflective members receive the first light beam at a first angle of incidence and receive the second light beam at a second angle of incidence substantially equal to the first angle of incidence.

The one or more reflective members may include a first reflective member to receive the first light beam and a second reflective member to receive the second light beam. The first reflective member may be rotatable such that motion of each sequential facet of reflective facets of the first reflective member sweeps the first light beam along the first path, and the second reflective member may be rotatable such motion of each sequential facet of reflective facets of the second reflective member sweeps the second light beam along the second path. The first reflective member and the second reflective member may be movable along a horizontal axis to cause the first beam to traverse a sequence of parallel first paths spaced apart along the horizontal axis and to cause the second light beam to traverse a sequence of parallel second paths spaced apart along the horizontal axis. An actuator may be operable to move the first reflective member and the second reflective member along the horizontal axis. The first reflective member and the second reflective member may be mounted on a support, and the support may be movable along the horizontal axis. A first actuator may be operable to move the first reflective member along the horizontal axis, and a second actuator may be operable to move the second reflective member along the horizontal axis. The first path and the second path may be offset from one another by a plurality of voxels spanning at least half of a length of the uppermost layer along the horizontal axis. The first path and the second path may be adjacent to one another along the horizontal axis.

An intensity of the first light beam may be greater than an intensity of the second light beam. The one or more reflective members may be configured to redirect the first light beam and the second light beam such that the first light beam is swept along a portion of the uppermost layer before the second light beam is swept along the same portion of the uppermost layer.

An intensity of the first light beam may be less than an intensity of the second light beam, and the one or more reflective members may be configured to redirect the first light beam and the second light beam such that the first light beam is swept along a portion of the uppermost layer before the second light beam is swept along the portion of the uppermost layer.

The energy delivery system may include a beam expander configured to expand the first light beam such that a spot of the first light beam on the uppermost layer is larger than a spot of the second light beam on the uppermost layer. The one or more reflective members may be configured to redirect the first light beam and the second light beam such that the first light beam is swept along a portion of the uppermost layer before the second light beam is swept along the portion of the uppermost layer.

The one or more light sources may include one or more lasers configured to emit the first light beam and the second light beam toward the one or more reflective members. The one or more reflective members may be one or more polygon mirrors each defining a regular convex polygon. The one or more reflective members may include a plurality of polygon mirrors each defining a regular convex polygon.

An actuator may be operably connected to the one or more reflective members. The actuator may be configured to continuously rotate the one or more reflective members to sweep the first light beam along the first path or to sweep the second light beam along the second path.

The first path and the second path may be lines on the uppermost layer.

Advantages of the foregoing may include, but are not limited to, the following. An energy delivery system in accordance to the foregoing may deliver energy to multiple regions simultaneously, thereby increasing the throughput of objects formed by an additive manufacturing apparatus. In some cases, the energy delivered to multiple regions can be in the form of multiple distinct light beams, each light beam having unique properties. For example, the light beams can deliver energy to the feed material at different rates. This can allow dispensed material can be heated and undergo cooling to desired temperatures in a controlled manner. For example, the energy can be delivered more uniformly across the uppermost layer of feed material or can be delivered so that the temperature of the feed material increases more gradually than in cases in which a single light beam is used to sinter, melt, or cure feed material. This can improve the resolution of the object and the precision of geometry of the object.

The energy delivery system may deliver energy more uniformly to different portions of an uppermost layer of feed material in other ways. For a particular light beam, the dwell time of the light beam delivered by the energy delivery system to each voxel across the layer can be more uniform. This can prevent energy delivered by the energy delivery system from being concentrated in a particular region of the layer of feed material due to a delay required for acceleration and deceleration of the reflective member.

In some cases, the energy delivery system can deliver the energy more evenly across the uppermost layer of feed material than energy delivery systems that rely on acceleration and deceleration of one or more reflective members to deliver energy to different portions of the uppermost layer of feed material. The energy delivery system can reduce energy delivery variation caused by changes in motion of members of the energy delivery system that redirect light beams toward a platform of the additive manufacturing apparatus. For example, the energy delivery system can deliver energy consistently to outer surfaces of objects to be formed by the additive manufacturing apparatus and interior of the objects to be formed. As a result, the surfaces of the objects can have fewer surface deformations than objects formed by additive manufacturing apparatuses that deliver energy in a process that includes longer dwell times to form outer surfaces of the objects. Furthermore, fewer post-processing operations are necessary to achieve a desired surface quality of the object to be formed.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 5A and 5B are top views of platforms overlaid with example patterns of energy delivered to the platforms.

FIGS. 9A, 10A, 11A, and 12A are schematic side perspective views of examples of additive manufacturing apparatuses.

FIGS. 9B, 10B, 11B, and 12B are schematic top views of light beams being swept on platforms of the additive manufacturing apparatuses of FIGS. 9A, 10A, 11A, and 12A, respectively.

FIGS. 13A-13D and 14 illustrate examples of processes to deliver energy to a platform using different patterns of energy delivery.

Like reference numbers and designations in the various drawings indicate like elements.

DETAILED DESCRIPTION

In many additive manufacturing processes, energy is selectively delivered to a layer of feed material dispensed by an additive manufacturing apparatus to fuse the feed material in a pattern to form a portion of an object. In some cases, an energy delivery system of the additive manufacturing system delivers the energy to one more points along the layer of dispensed feed material. For example, a laser beam can be reflected off two galvo-driven mirrors whose positions are controlled to drive the laser beam in a vector-scan manner across the layer of feed material in which the laser beam traces a vector path in a continuous manner. Because the reflective members need to be accelerated and decelerated to control location of the laser beam, the dwell time of the laser beam might not be uniform across the layer.

However, a reflective member that continuously rotates in a single direction can be used in conjunction with modulation of the light beam to control where the energy is delivered. The continuous motion of the reflective member can reduce the number of delays required for scanning the light beam across the feed material, thus improving the throughput of objects formed by an additive manufacturing apparatus including the energy delivery system.

Furthermore, the object to be formed can have improved surface quality when energy delivered to the feed material is more consistently distributed. By delivering the one or more light beams through components that move at constant velocities, e.g., constant rotational velocity, with minimal acceleration and deceleration, the energy delivery system can improve uniformity of the dwell time of the light beam. This can reduce the likelihood of inconsistent energy distribution.

The energy delivery system can direct two or more light beams to the reflective member such that the reflective member can simultaneously redirect multiple light beams to different portions of the uppermost layer of feed material. In some cases, the energy delivery system of the additive manufacturing apparatus can include two or more reflective members that direct multiple light beams to the uppermost layer of feed material.

These multiple light beams can be used to scan distinct regions on of the feed material; this permits throughput to be increased because each beam need only traverse a more limited area of the feed material.

Alternatively, one light beam can "chase" another light beam, e.g., be used to scan the same pattern. In this case a first light beam can be used for pre-heading of the feed material and a second light beam can be used for fusing of the feed material. Alternatively, a first light beam can be used for fusing of the feed material and a second light beam can be used to control the rate of cooling of the feed material, e.g., after melting.

Example Additive Manufacturing Apparatuses

Figure 1A:
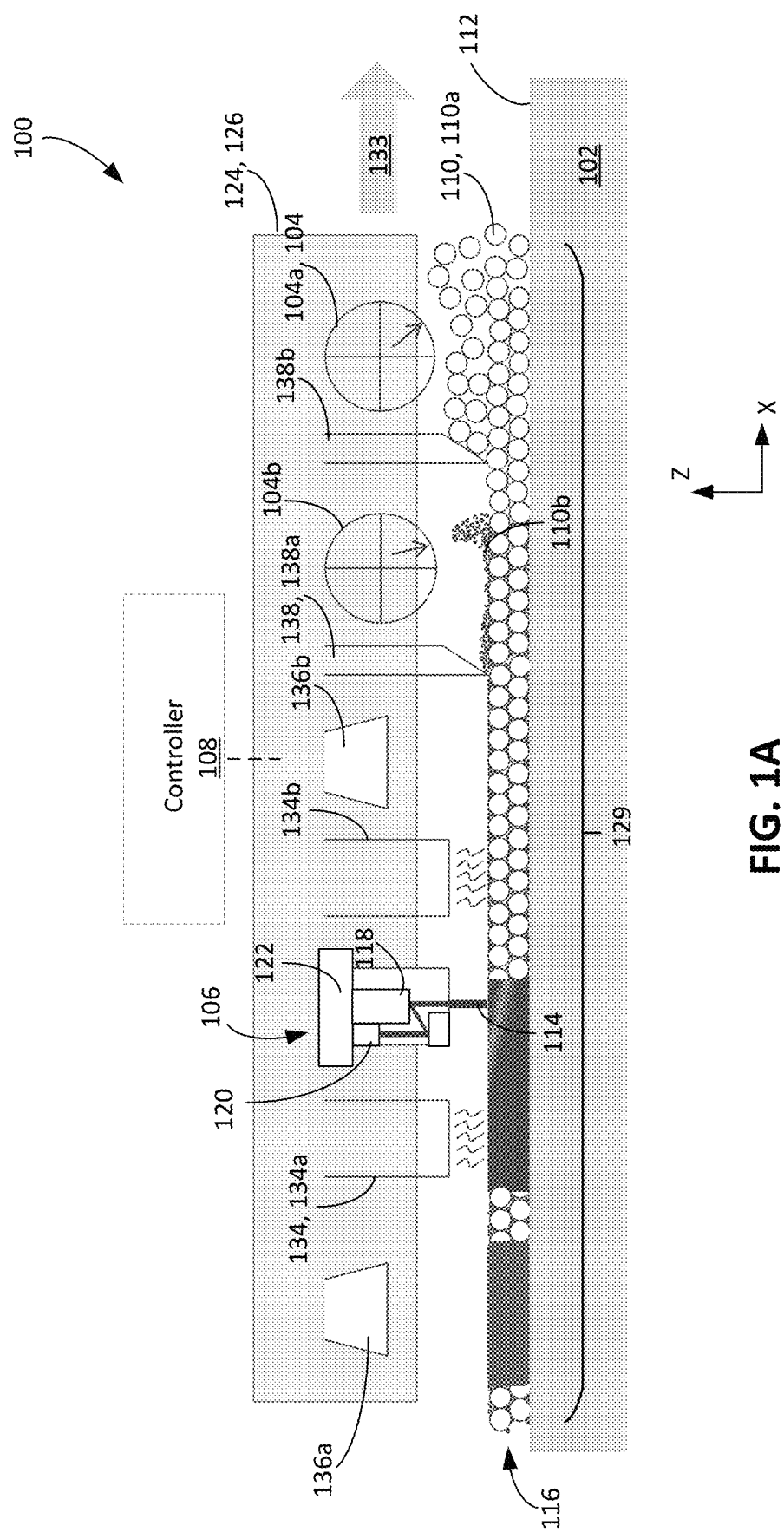
FIGS. 1A and 1B are schematic side and top views of an example of an additive manufacturing apparatus.
Figure 1B:
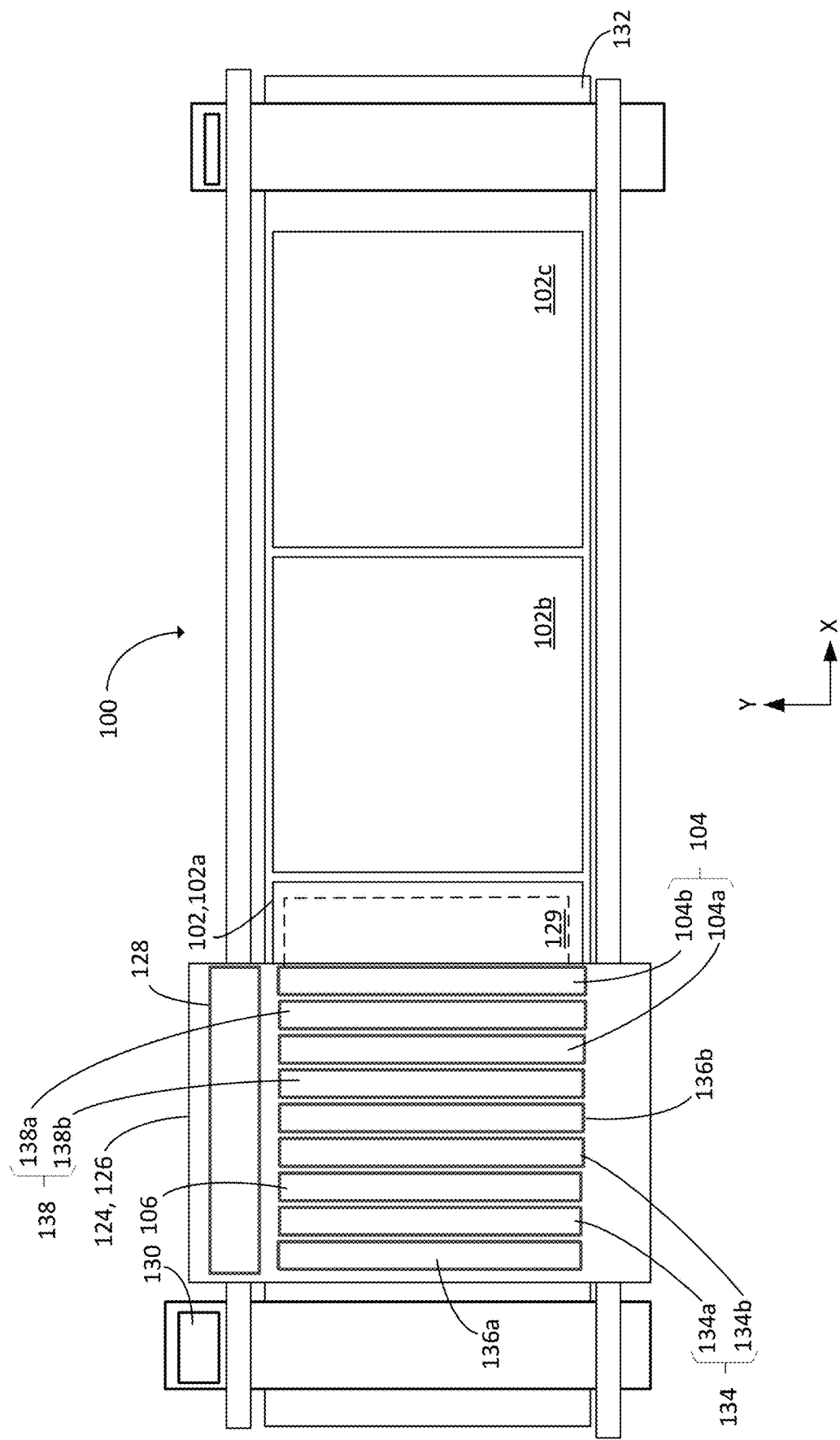

Referring to FIGS. 1A and 1B, an example of an additive manufacturing apparatus 100 includes a platform 102, a dispenser 104, an energy delivery system 106, and a controller 108. During an operation to form an object, the dispenser 104 dispenses successive layers of feed material 110 on a top surface 112 of the platform 102. The energy delivery system 106 emits one or more light beams to deliver energy to an uppermost layer 116 of the layers of feed material 110, thereby causing the feed material 110 to be fused, for example, in a desired pattern to form the object. In the example depicted in FIGS. 1A and 1B, the energy delivery system 106 is operated to emit a light beam 114 to deliver energy to the uppermost layer 116. The controller 108 operates the dispenser 104 and the energy delivery system 106 to control dispensing of the feed material 110 and to control delivery of the energy to the layers of feed material 110. The successive delivery of feed material and fusing of feed material in each of the successively delivered layers result in formation of the object.

As described herein, in some examples, an additive manufacturing apparatus similar to the additive manufacturing apparatus can include an energy delivery system that directs multiple light beams to the uppermost layer. Such an additive manufacturing apparatus can have features and systems similar to the additive manufacturing apparatus 100 described with respect to FIGS. 1A and 1B.

As described herein with respect to FIGS. 2 and 3A-3C, the energy delivery system 106 includes a light source 120 to emit the light beam 114. The energy delivery system 106 further includes one or more reflective members that are rotatable and that redirect the one or more light beams toward the uppermost layer 116. As shown in FIGS. 1A and 1B, the energy delivery system includes a reflective member 118 to redirect the light beam 114. The reflective member 118 is rotatable to sweep the light beam 114 along a path, e.g., a linear path, on the uppermost layer 116, e.g., to cause the light beam 114 to scan the uppermost layer 116 along the Y-axis (shown in FIGS. 3A-3C). In conjunction with relative motion of the energy delivery system 106 and the platform 102, or deflection of the light beam 114 by another reflector, e.g., a galvo-driven mirror, a sequence of sweeps along the path by the light beam 114 can create a raster scan of the light beam 114 across the uppermost layer 116.

As the light beam 114 sweeps along the path, the light beam 114 can be modulated, e.g., by causing the light source 120 to turn the light beam 114 on and off, in order to deliver energy to selected regions of the layers of feed material 110 and fuse the material in the selected regions to form the object in accordance to the desired pattern. Alternatively, e.g., if the light beam 114 is being used for pre-heating or control of the cooling rate, then the light beam can be operated at a constant intensity.

In some implementations, the light source 120 includes a laser configured to emit the light beam 114 toward the reflective member 118. The reflective member 118 is positionable in a path of the light beam 114 emitted by the light source 120 such that a reflective surface of the reflective member 118 receives the light beam 114. The reflective member 118 then redirects the light beam 114 toward the top surface of the platform 102 to deliver energy to an uppermost layer 116 of the layers of feed material 110 to fuse the feed material 110. For example, the reflective surface of the reflective member 118 reflects the light beam 114 to redirect the light beam 114 toward the platform 102.

In some implementations, the energy delivery system 106 is mounted to a support 122 that supports the energy delivery system 106 above the platform 102. In some cases, the support 122 (and the energy delivery system 106 mounted on the support 122) is rotatable relative to the platform 102. In some implementations, the support 122 is mounted to another support 124 arranged above the platform 102. The support 124 can be a gantry that supports the energy delivery and dispensing systems of the additive manufacturing apparatus 100 above the platform 102.

In some cases, the support 122 is rotatably mounted on the support 124. The reflective member 118 is rotated when the support 122 is rotated, e.g., relative to the support 124, thus reorienting the path of the light beam 114 on the uppermost layer 116. For example, the energy delivery system 106 can be rotatable about an axis extending vertically away from the platform 102, e.g., an axis parallel to the Z-axis, between the Z-axis and the X-axis, and/or between the Z-axis and the Y-axis. Such rotation can change the azimuthal direction of the path of the light beam 114 along the X-Y plane, i.e., across the uppermost layer 116 of feed material.

A printhead 126 can include the support 122. The printhead 126 is arranged above the platform 102 and is repositionable along one or more horizontal directions relative to the platform 102. The various systems mounted to the printhead 126 can be modular systems whose horizontal position above the platform 102 is controlled by a horizontal position of the printhead 126 relative to the platform 102. For example, the printhead 126 can be mounted to the support 124, and the support 124 can be movable to reposition the printhead 126.

In some implementations, an actuator system 128 includes one or more actuators engaged to the systems mounted to the printhead 126. In some implementations, the printhead 126 and the constituent systems do not span the operating width of the platform 102. In this case, the actuator system 128 is operable to drive the system across the support 124 such that the printhead 126 and each of the systems mounted to the printhead 126 are movable along the Y-axis. In some implementations (shown in FIG. 1B), the printhead 126 and the constituent systems span the operating width of the platform 102, and motion along the Y-axis is not necessary.

For movement along the X-axis, in some cases, the apparatus 100 further includes an actuator 130 configured to drive the printhead 126 and the support 124 in their entireties relative to the platform 102 along the X-axis. Alternatively or additionally, the apparatus 100 includes a conveyor 132 on which the platform 102 is located. The conveyor 132 is driven to move the platform 102 along the X-axis relative to the printhead 126.

The actuator 130 and/or the conveyor 132 causes relative motion between the platform 102 and the support 124 such that the support 124 advances in a forward direction 133 relative to the platform 102. The dispenser 104 can be positioned along the support 124 ahead of the energy delivery system 106 so that feed material 110 can be first dispensed, and the recently dispensed feed material can then be cured by energy delivered by the energy delivery system 106 as the support 124 is advanced relative to the platform 102.

In some cases, the platform 102 is one of multiple platforms 102a, 102b, 102c. Relative motion of the support 124 and the platforms 102a-102c enables the systems of the printhead 126 to be repositioned above any of the platforms 102a-102c, thereby allowing feed material to be dispensed and fused on each of the platforms 102a, 102c to form multiple objects.

In some implementations, the additive manufacturing apparatus 100 includes a bulk energy delivery system 134. For example, in contrast to delivery of energy by the energy delivery system 106 along a path on the uppermost layer 116 of feed material, the bulk energy delivery system 134 delivers energy to a predefined area of the uppermost layer 116. The bulk energy delivery system 134 can include a heating lamp that, when activated, delivers the energy to the predefined area within the uppermost layer 116 of feed material 110.

The bulk energy delivery system 134 is arranged ahead of or behind the energy delivery system 106, e.g., relative to the forward direction 133. The bulk energy delivery system 134 can be arranged ahead of the energy delivery system 106, for example, to deliver energy immediately after the feed material 110 is dispensed by the dispenser 104. This initial delivery of energy by the bulk energy delivery system 134 can stabilize the feed material 110 prior to delivery of energy by the energy delivery system 106 to fuse the feed material 110 to form the object.

Alternatively, the bulk energy delivery system 134 can be arranged behind the energy delivery system 106, for example, to deliver energy immediately after the energy delivery system 106 delivers energy to the feed material 110. This subsequent delivery of energy by the bulk energy delivery system 134 can control the cool-down temperature profile of the feed material, thus providing improved uniformity of curing. In some cases, the bulk energy delivery system 134 is a first of multiple bulk energy delivery systems 134a, 134b, with the bulk energy delivery system 134a being arranged behind the energy delivery system 106 and the bulk energy delivery system 134b being arranged ahead of the energy delivery system 106.

Optionally, the apparatus 100 includes a first sensing system 136a and/or a second sensing system 136b to detect properties, e.g., temperature, density, and material, of the layer 106 as well as powder dispensed by the dispenser 104. The controller 108 can coordinate the operations of the energy delivery system 106, the dispenser 104, and, if present, any other systems of the apparatus 100. In some cases, the controller 108 can receive user input signal on a user interface of the apparatus or sensing signals from the sensing systems 136a, 136b of the apparatus 100, and control the energy delivery system 106 and the dispenser 104 based on these signals.

Optionally, the apparatus 100 can also include a spreader 138, e.g., a roller or blade, that cooperates with first the dispenser 104 to compact and/or spread feed material 110 dispensed by the dispenser 104. The spreader 138 can provide the layer with a substantially uniform thickness. In some cases, the spreader 138 can press on the layer of feed material 110 to compact the feed material 110. The spreader 138 can be supported by the support 124, e.g., on the printhead 126, or can be supported separately from the printhead 126.

In some implementations, the dispenser 104 includes multiple dispensers 104a, 104b, and the feed material 110 includes multiple types of feed material 110a, 110b. A first dispenser 104a dispenses the first feed material 110a, while a second dispenser 104b dispenses the second feed material 110b. If present, the second dispenser 104b enables delivery of a second feed material 110b having properties that differ from those of the first feed material 110a. For example, the first feed material 110a and the second feed material 110b can differ in material composition or average particle size.

In some implementations, the particles of the first feed material 110a can have a larger mean diameter than the particles of the second feed material 110b, e.g., by a factor of two or more. When the second feed material 110b is dispensed on a layer of the first feed material 110a, the second feed material 110b infiltrates the layer of first feed material 110a to fill voids between particles of the first feed material 110a. The second feed material 110b, having a smaller particle size than the first feed material 110a, can achieve a higher resolution.

In some cases, the spreader 138 includes multiple spreaders 138a, 138b, with the first spreader 138a being operable with the first dispenser 104a to spread and compact the first feed material 110a second spreader 138b being operable with the second dispenser 104b to spread and compact the second feed material 110b.

Figure 2:
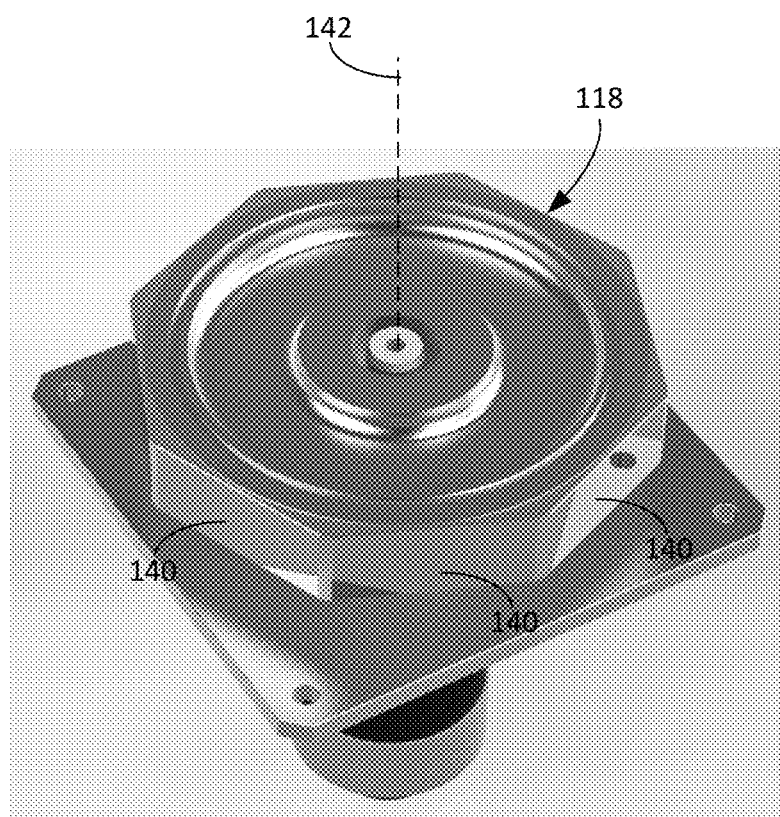
FIG. 2 is a perspective view of a reflective member.

Referring to FIG. 2, the reflective member 118 has multiple reflective facets 140 each having a reflective surface that reflects received light, e.g., the light beam 114, or multiple light beams. The reflective member 118 includes a polygonal mirror. The reflective facets 140 define a corresponding segments of the polygon, with the reflective facets 140 being joined at vertices of the polygon. In this regard, each of the reflective facets 140 form a continuous loop about an axis of rotation 142 of the reflective member 118. As a result, rotation of the reflective member 118 about the axis of rotation 142 enables different reflective surfaces, e.g., the reflective facets 140, to sequentially receive the light beam 114. The rotation also enables different portions of the reflective facets 140 to receive the light beam 114.

The reflective surfaces of the reflective facets 140, in some examples, are substantially planar surfaces. In this case, the reflective facets 140 define a regular convex polygon. In some implementations, the reflective surfaces are convex or concave. In this case, the reflective facets 140 can define a Reuleaux polygon having sides of constant curvature, e.g., concave or convex curvature. The reflective facets 140 have substantially equal lengths. For example, each of the reflective facets 140 can have a length between 10 and 50 mm. The number of reflective facets 140 is between, for example, four and fifty, e.g., between four and thirty.

Figure 3:
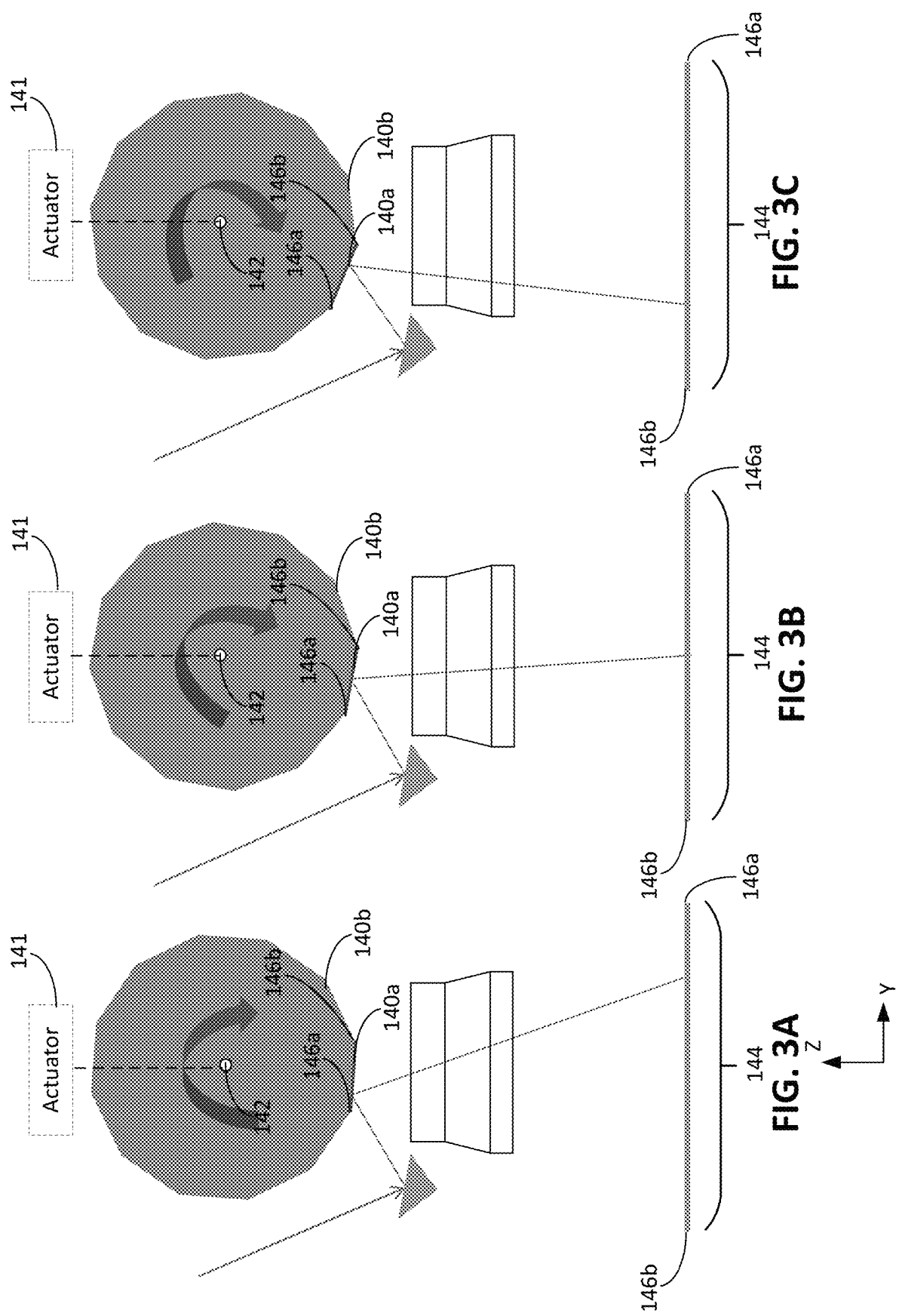
FIGS. 3A-3C illustrate a process of scanning a light beam across a platform.

Referring to FIGS. 3A-3C, the location at which the light beam 114 is incident on a reflective facet of the reflective member 118 varies with rotation of the reflective member 118 about the axis of rotation 142. The axis of rotation 142, in some cases, is parallel to the X-axis. The reflective member 118, when rotated about the axis of rotation 142, can spin without a change in a location along the X-axis or along the Y-axis relative to the support 122.

The relative positions and dimensions of the reflective member 118, in conjunction with projection optics, can be such rotation of the member 118 causes each facet 140 to sweep the light beam 114 across an entire width of the feed material delivery area 129, e.g., along the Y-axis. For example, if the reflective facet 140 defines a segment of a regular convex polygon, as the spot where the light beam 114 impinges the facet 140 moves from one vertex to the other vertex, the light beam 114 is swept along a path on the uppermost layer 116 from one end 146*a* of a region 144 of the feed material delivery area 129 to another end 146*b* of the region 144 of the feed material delivery area 129, e.g., along the Y-axis.

In some cases, the region extends across the entire width of the feed material delivery area 129. Alternatively, as described herein, the region extends across a portion of the width of the feed material delivery area 129. The reflective member 118 can be repositioned to enable the energy to be delivered across the entire width of the feed material delivery area 129.

In some examples, the energy delivery system 106 includes a rotary actuator 141 operably connected to the reflective member 118. The actuator 141 is driven to rotate the reflective member 118 about the axis of rotation 142.

The controller 108 can be configured to cause the actuator 141 to rotate continuously during processing of a layer of the feed material. Thus, the reflective member 118 repeatedly sweeps the light beam 114 along the path on the uppermost layer 116 of feed material 110. The actuator 141 is configured to rotate the reflective member 118 at a constant velocity between 1 and 500 rpm (depending on the diameter and the number of facets of the polygon). The actuator 141 can be configured to rotate the reflective member 118 such that the light beam sweeps across the feed material 110 at a constant velocity between 1 mm/s and 40 m/s. The actuator 141 can rotate at a rate that allows the light beam 114 to sweep across one reflective facet 140 in 1 to 500 milliseconds, e.g., 5 to 400 milliseconds.

Figure 4:
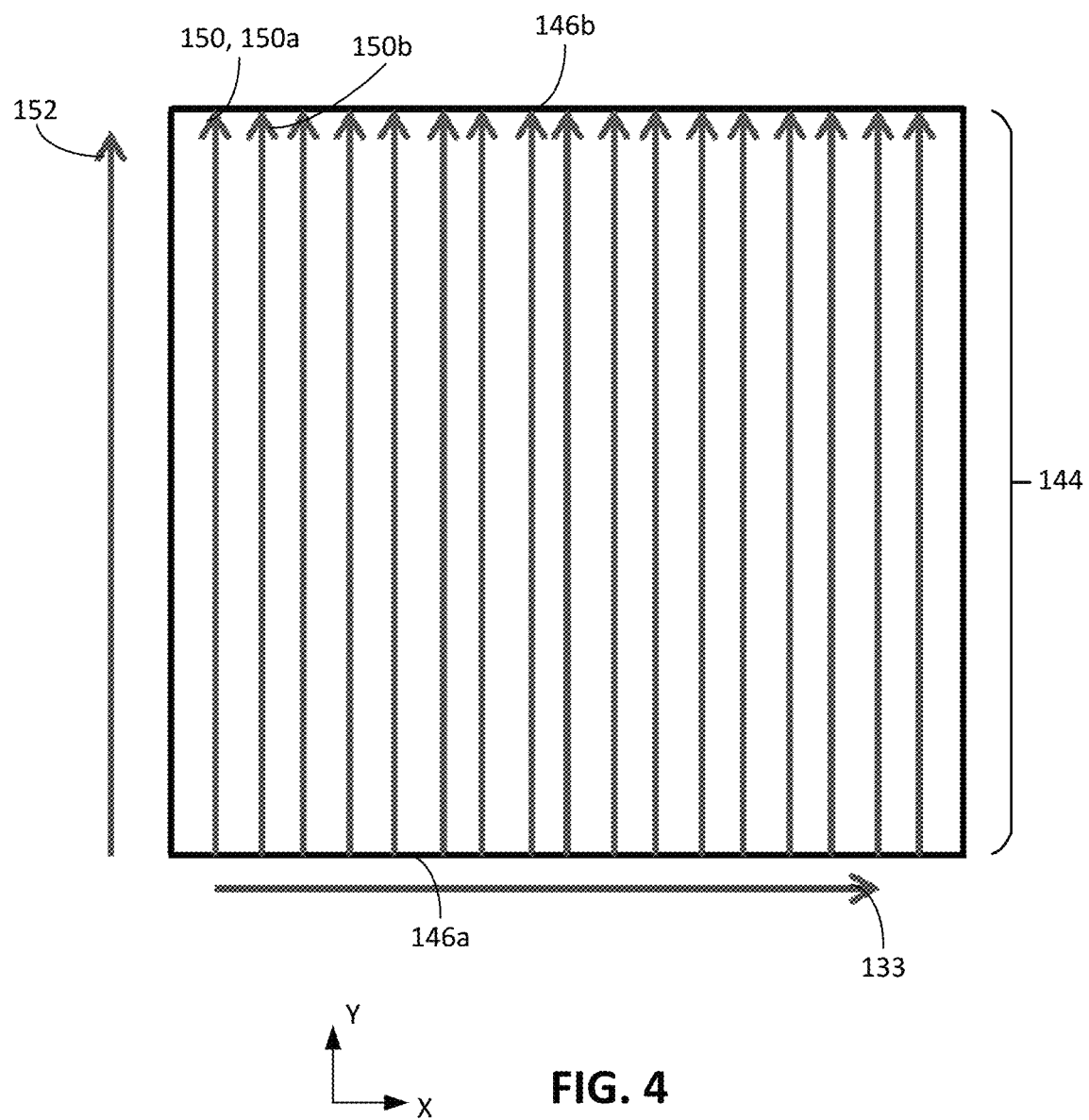
FIG. 4 is a top view of a platform overlaid with a scanning pattern of a light beam.

Referring to FIG. 4, in some implementations, between sequential reflective facets 140*a*, 140*b*, the reflective member 118 is advanced relative to the platform 102, e.g., along the X-axis. As a result, the light beam 114 is swept along a first path 150*a* on the uppermost layer 116 when the light beam 114 is swept across the first reflective facet 140*a*, and the light beam 114 is swept along a second path 150*b* when the light beam 114 is swept across the second reflective facet 140*b*. The paths 150*a*, 150*b* can be parallel. The second path 150*b* of the light beam 114 is offset along the X-axis from the first path 150*a* of the light beam 114. Each reflective facet 140 can thus sweep along a unique path within the region 144 above the platform 102 to fuse different portions of the dispensed feed material 110.

As the actuator 141 is rotated, the light beam 114 scans across in a first horizontal direction, e.g., a scanning direction 152. For example, the reflective member 118 is continuously advanced relative to the platform 102 along the X-axis as the reflective member 118 is rotated. As a result, the path 150*a*, 150*b* can be parallel and can be angled relative to Y-axis due to the motion of the reflective member 118 relative to the platform 102 in the forward direction 133. The reflective member 118 can be rotated relative to the platform 102, e.g., through rotation of the support 122, to compensate for any angle of the path 150*a*, 150*b* relative to the X-axis.

In some implementations, the actuator 130 is operated to advance the support 122 and thereby to advance the reflective member 118 in the forward direction 133. The support 122 is movable in a horizontal direction, e.g., the forward direction 133, that is at a non-zero angle relative to a path 150 swept by the light beam 114. In some cases, the forward direction 133 is perpendicular to the path 150. Alternatively, the forward direction 133 forms an angle with the path 150 that is less than 90 degrees. The angle can be greater than 45 degrees. While described as being advanced through operation of the actuator 130, in some cases, the reflective member 118 is advanced relative to the platform 102 (and hence relative to the region 144) through operation of the conveyor 132.

In some implementations, a path 150 of the light beam 114 swept along the uppermost layer 116 of feed material 110 forms a line, e.g., a straight line, on the uppermost layer 116. The path 150, for example, includes a continuous line spanning from the first end 146*a* to the second end 146*b* of the region 144. If the region 144 corresponds to the feed material delivery area 129, the line can extend across an entire width of the feed material delivery area 129 on the platform 102.

Referring to FIG. 5A, the rotation of the reflective member 118 in combination with the translation of the reflective member 118 relative to the platform 102 enables the light beam 114 to be directed across the entirety of the region 144. In some cases, the light source 120 can be selectively operated and the light beam 114 can be scanned to generate patterns of light beam coverage spanning over a portion of the region 144. The controller 108 can receive and/or store data in a non-transitory computer readable medium, with the data defining a pattern of light beam coverage.

In some cases, a pattern 154*a* defined by the data covers the entirety of the region 144. The controller 108 can continuously operate the light source 120 such that the light beam 114 is swept along a continuous line extending across the entire region 144, e.g., across an entire width of the region 144 in the scanning direction 152. The energy delivery system 106 can be advanced as the light beam 114 is swept across the platform 102 so that the light beam 114 can cover the entirety of the region 144 by being scanned across the region 144 in accordance to the pattern 154*a*.

Alternatively, referring to FIG. 5B, a pattern 154*b* defined by the data covers a portion of the region 144. The pattern 154*b* can cover a portion of a length of the region 144 extending in the forward direction 133 and can also cover a portion of the width of the region 144 extending in the scanning direction 152. Rather than controlling the actuator 141 to control the coverage of the light beam 114 along the width of the region 144, the controller 108 can selectively activate the light source 120 such that the light beam 114 is only generated when the reflective member 118 is oriented to direct the light beam 114 toward a first area 156*a* of the region 144. Accordingly, the light beam 114 is not generated when the reflective member 118 is oriented not to direct the light beam 114 toward the first area 156*a* of the region 144, e.g., oriented to direct the light beam 114 toward a second area 156b of the region 144. Energy is thus delivered to the area 156a but is not delivered to the area 156b.

The actuator 141 is operated to continuously rotate the reflective member 118 during this process of selectively activating the light source 120 such that, when the light beam 114 is being directed toward the region 144, the dwell time of the light beam 114 is uniform along the path, e.g., along the Y-axis. Similarly, the actuator 130 can be operated to translate the energy delivery system 106 relative to the platform 102 during this process of selectively activating the light source 120 such that the dwell time of the light beam 114 is uniform along the forward direction 133, e.g., along the X-axis.

Non-uniform dwell time can cause poor surface quality of the object to be formed, and can occur due to, for example, a reduction in speed of the reflective member 118 or a reversal in direction of rotation of the reflective member 118. However, because the reflective member 118 is continuously rotated, such dwelling of the light beam 114 can be avoided. In some cases, the light beam 114 can be selectively activated, e.g., pulsated, to selectively cure voxels of the feed material.

Figure 6A:
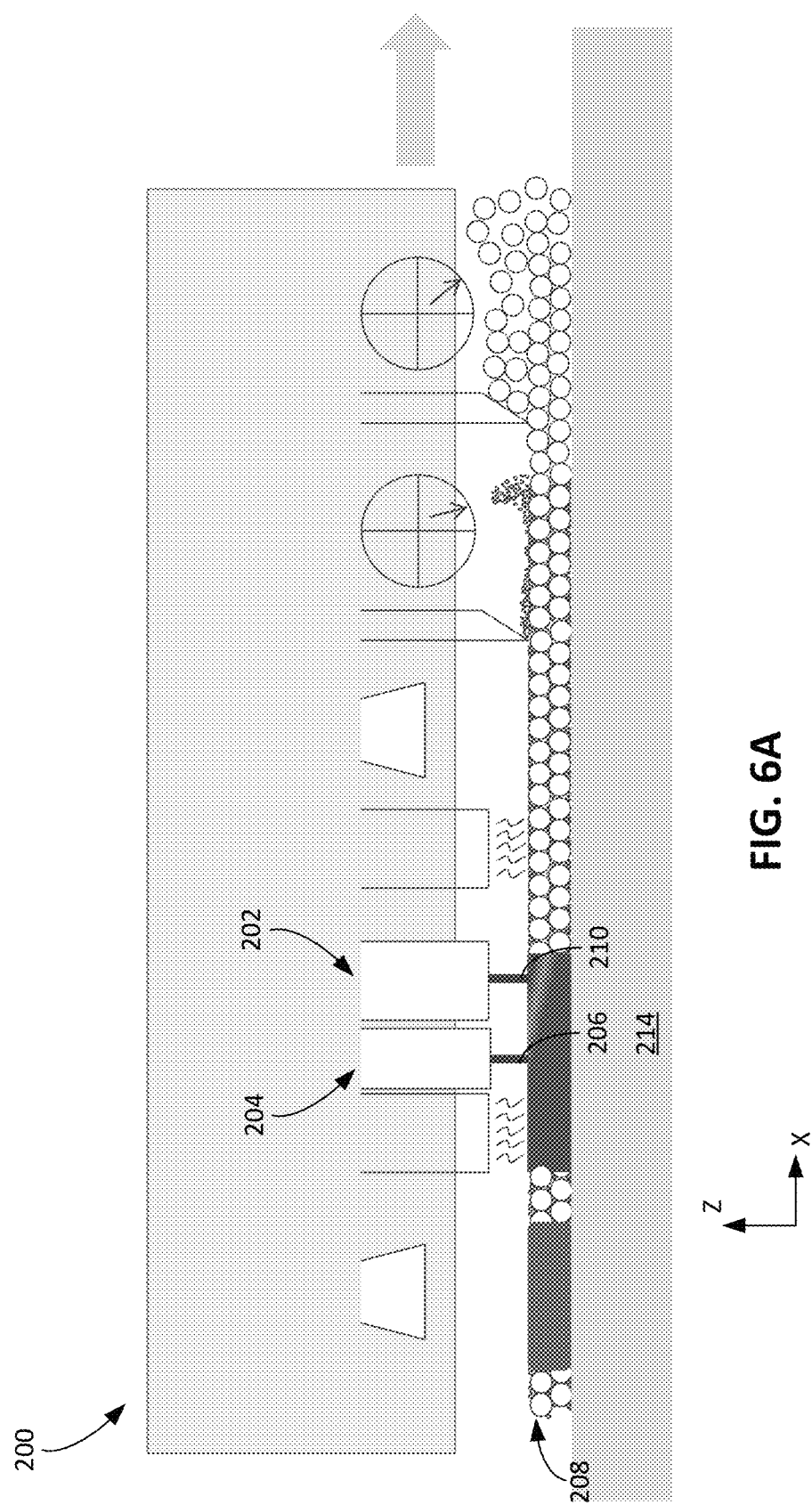
FIGS. 6A and 6B are schematic side and top views, respectively, of another example of an additive manufacturing apparatus.
Figure 6B:
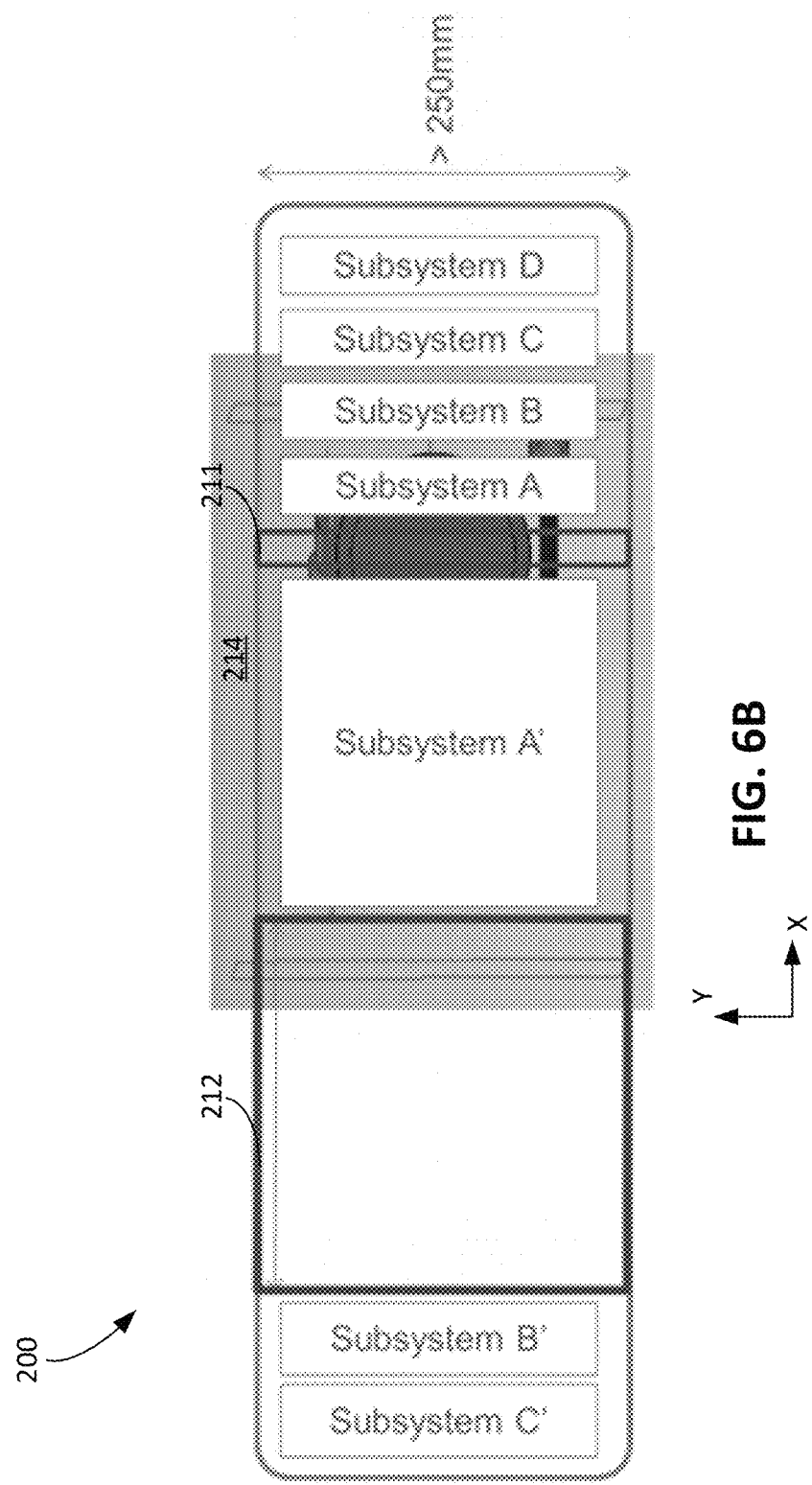

FIGS. 6A and 6B depict an additive manufacturing apparatus 200 similar to the additive manufacturing apparatus 100. The additive manufacturing apparatus 200 differs from the additive manufacturing apparatus 100 in that the additive manufacturing apparatus 200 includes a second energy delivery system 204 in addition to a first energy delivery system 202. The first energy delivery system 202 is similar to the energy delivery system 106 described with respect to the additive manufacturing apparatus 200 and thus propagates a light beam 210 along a path on an uppermost layer 208 of feed material.

Figure 7:
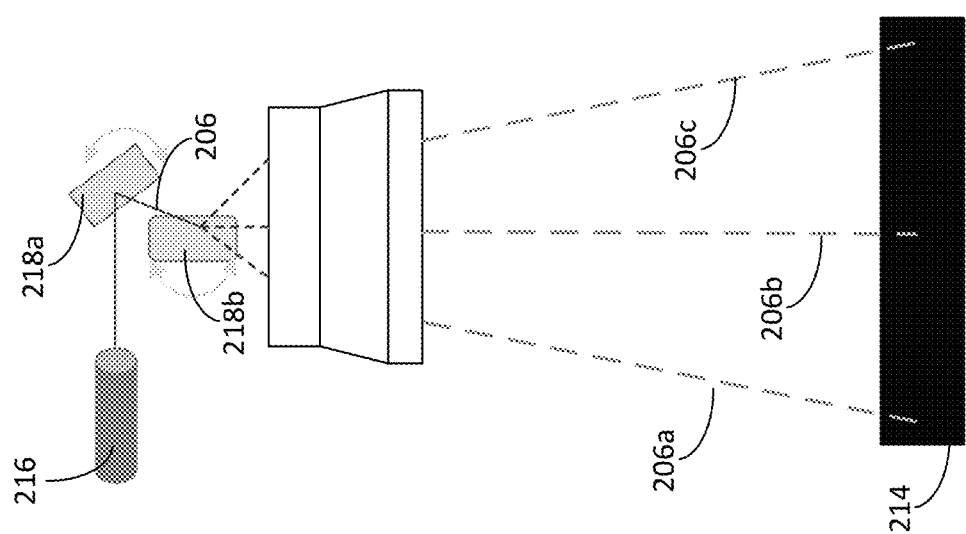
FIG. 7 is a schematic side view of an energy delivery system of the additive manufacturing apparatus of FIG. 6A.

Referring also to FIG. 7, the second energy delivery system 204 includes a light source 216 to generate a light beam 206 to be swept along a vector path on the uppermost layer 208 of feed material. The light source 216 is, for example, part of a mirror galvanometer. The mirror galvanometer can further include one or more reflective members 218a, 218b, e.g., galvo-driven mirrors. In contrast to the reflective member 118 of the energy delivery system 106 (e.g., the reflective member of the energy delivery system 202), the reflective members 218a, 218b of the energy delivery system 204 can be accelerated and decelerated to achieve energy delivery along the desired vector path. In particular, a reflective surface of the reflective member 218a can be moved to control a position of the light beam 206 (e.g., depicted as light beams 206a, 206b, 206c) on the uppermost layer 208 of feed material along the X-axis, and a reflective surface of the reflective member 218b can be moved to control a position of the light beam 206 on the uppermost layer 208 of feed material along the Y-axis. The reflective members 218a, 218b are both reoriented and translated along the X-axis and the Y-axis when moved to control the position of the light beam 206.

Referring to FIG. 6B, motion of the reflective member of the energy delivery system 202 can enable the light beam 210 to sweep across a region 211 extending across an entire width of the platform along the Y-axis. In contrast, a region 212 to which the second energy delivery system 204 can deliver the light beam 206 extends along both the X-axis and Y-axis. In some cases, the region 212 extends along an entire area of a platform 214 of the additive manufacturing apparatus 200.

Rather than selective activation of the light source of the second energy delivery system 204 to sweep the light beam 206 along the desired vector path, the reflective members 218a, 218b are moved to redirect the light beam 206 along the desired vector path. In this regard, the light beam 206 can be continuously emitted while the reflective members 218a, 218b are being moved. The reflective members 218a, 218b can be, for example, incrementally rotated. The reflective members 218a, 218b can be accelerated and decelerated to adjust the trajectory of the path of the light beam 206. Furthermore, in some cases, while the first energy delivery system 202 is advanced along the X-axis relative to the platform 214 to redirect the light beam 114 along paths extending along the X-axis, the light beam 206 of the second energy delivery system 204 can be directed along two-dimensional paths extending along both the X-axis and the Y-axis through motion of the reflective members 218a, 218b of the second energy delivery system 204. For example, the reflective members 218a, 218b of the second energy delivery system 204 can include multiple reflective surfaces movable such that the reflective surfaces are repositionable to receive the light beam 206 and redirect the light beam 206 along a two-dimensional path on the uppermost layer 208.

Figure 8C:
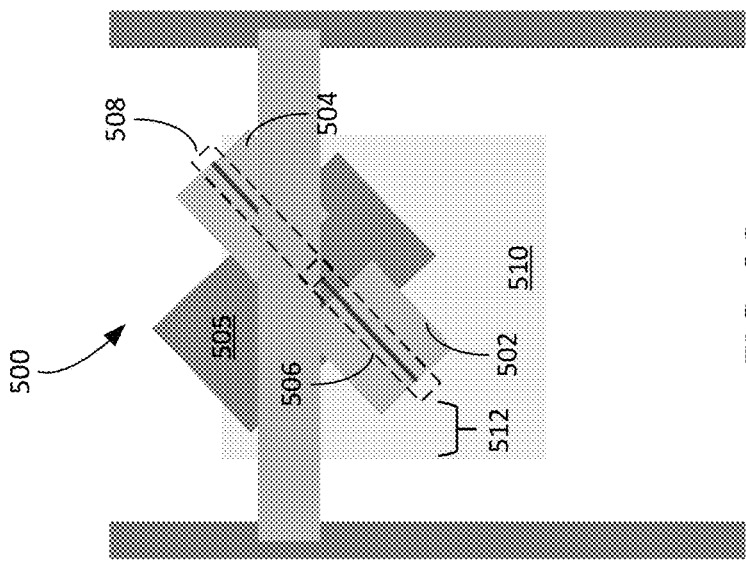
FIGS. 8A-8C are schematic top views of further examples of additive manufacturing apparatuses each including multiple energy delivery systems.
Figure 8B:
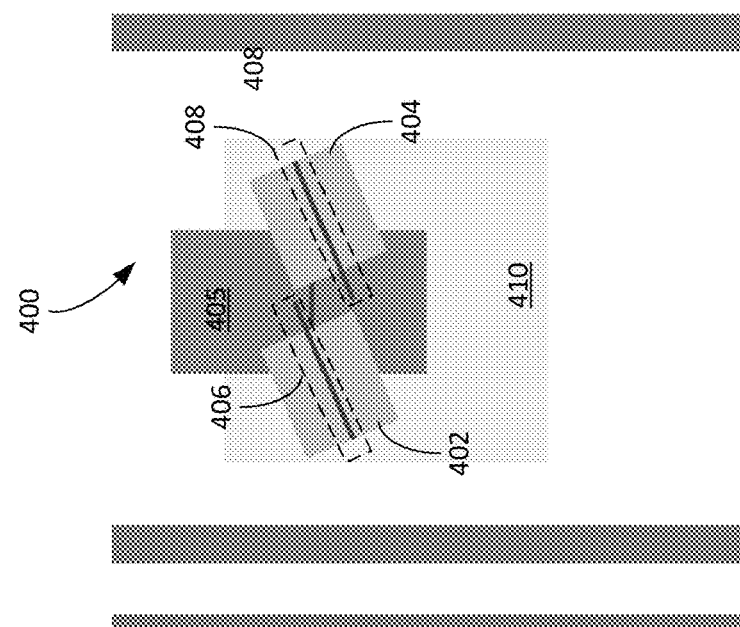
Figure 8A:
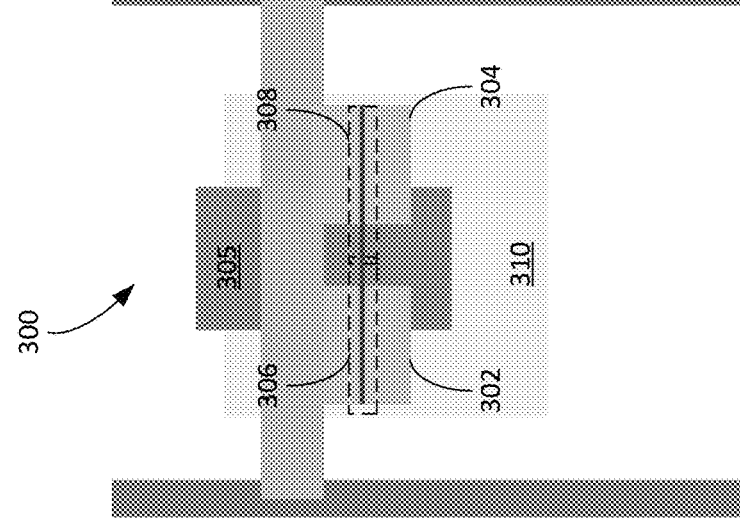

While the additive manufacturing apparatuses 100, 200 are described to include a single energy delivery system including a light source and a rotatable reflective member, in some implementations, referring to FIGS. 8A-8C, an additive manufacturing apparatus includes multiple energy delivery systems having rotatable reflective members, e.g., polygon mirrors. Referring to FIG. 8A, an additive manufacturing apparatus 300 includes a first energy delivery system 302 and a second energy delivery system 304, each energy delivery system 302, 304 including a light source and reflective member similar to the light source 120 and the reflective member 118 described with respect to the energy delivery system 106. The energy delivery systems 302, 304 are both mounted to a support 305, e.g., similar to the support 122.

The energy delivery systems 302, 304, absent motion of the support 305 along the X-axis, direct light beams along paths extending along a horizontal direction. For example, the paths can extend along the Y-axis within regions 306, 308, respectively. The region 306 can overlap the region 308. The paths can be parallel to the Y-axis, and the support 305 can be incrementally advanced so that each energy delivery system 302, 304 can sweep the light beams along a series of parallel paths. These parallel paths do not extend across the entire width of a platform 310 of the additive manufacturing apparatus 300 but, when stitched together, cover a region extending across the entire width of the platform 310. As a result, the energy delivery system 302 can deliver energy to, for example, a first half of a platform 310, and the energy delivery system 304 can deliver energy to a second half of the platform 310.

Referring to FIG. 8B, an additive manufacturing apparatus 400 differs from the additive manufacturing apparatus 300 in that energy delivery systems 402, 404 of the additive manufacturing apparatus 400 are rotatable relative to a support 405 to which the energy delivery systems 402, 404 are mounted. The energy delivery systems 402, 404, absent motion of a support 405 of the additive manufacturing apparatus 400 along the X-axis, direct light beams along paths extending along horizontal directions. For example, the paths can extend along the Y-axis within regions 406, 408, respectively. In contrast to the regions 306, 308, the regions 406, 408 extend along both the X-axis and Y-axis and form a non-zero angle with the Y-axis. The region 406 can overlap the region 408. The support 405 can be incrementally advanced so that each energy delivery system 402, 404 can sweep the light beams along a series of parallel paths, e.g., parallel to one another but angled relative to the Y-axis. These parallel paths do not extend across the entire width of the feed material delivery area of a platform 410 of the additive manufacturing apparatus 400 but, when stitched together, cover a region extending across the entire width of the feed material delivery area. As a result, the energy delivery system 402 can deliver energy to, for example, a first half of the feed material delivery area, and the energy delivery system 404 can deliver energy to a second half of the feed material delivery area.

In some implementations, the energy delivery systems 402, 404 are independently rotatable. As a result, the path of the light beam along the region 406 can be angled relative to the path of the light beam along the region 408. The pattern of light beam coverage for the energy delivery system 402 can thus have paths having angles relative to the Y-axis that differ from angles of paths of the pattern of light beam coverage formed by the energy delivery system 404.

Referring to FIG. 8C, an additive manufacturing apparatus 500 differs from the additive manufacturing apparatus 300 in that a support 505 to which both energy delivery systems 502, 504 are mounted is rotatable relative to a platform 510 of the additive manufacturing apparatus 500. The paths of the light beams delivered by the energy delivery systems 502, 504 can thus be rotated simultaneously with rotation of the support 505. The energy delivery systems 402, 404, absent motion of a support 505 of the additive manufacturing apparatus 400 along the X-axis, direct light beams along paths extending along one or both of the X-axis and the Y-axis within regions 506, 508, respectively. As shown in FIG. 8C, in some cases, the regions 506, 508 do not extend across an entire width of the feed material delivery area. In addition to being movable along the X-axis relative to the platform 510, the support 505 is movable along the Y-axis relative to the platform 510 so that the energy delivery systems 502, 504 to enable energy delivery to a portion 512 of the width that the regions 506, 508 do not cover.

In some implementations, the energy delivery systems 502, 504 are independently rotatable relative to the support 505 in a manner similar to the energy delivery systems 402, 404. In this regard, the angles of the light beam paths can be adjusted through both or either of rotation of the support 505 and independent rotation of the energy delivery systems 502, 504.

The additive manufacturing apparatuses 100, 200 described above deliver a single light beam to the uppermost layer 208. However, in some implementations, an additive manufacturing apparatus can deliver multiple light beams to an uppermost layer of feed material, e.g., as described with respect to the additive manufacturing apparatuses 300, 400, 500. The light beams can be directed to different locations along the uppermost layer of feed material. FIGS. 9A-13B illustrate examples of such additive manufacturing apparatuses 600, 700, 800, 900 including energy delivery systems 602, 702, 802, 902 and platforms 610, 710, 810, 910, respectively. The additive manufacturing apparatuses 600, 700, 800, 900 include systems similar to the additive manufacturing apparatuses 100, 200 except with respect to the energy delivery systems 602, 702, 802, 902. In this regard, systems such as dispensers, bulk energy delivery systems, spreaders, controllers, actuators, printheads, support structures, sensing systems, and other elements and configurations described with respect to the additive manufacturing apparatus 100, 200, 300, 400, 500 are applicable to the additive manufacturing apparatuses 600, 700, 800, 900. For example, the additive manufacturing apparatuses 600, 700, 800, 900 include mechanisms to generate relative motion between the energy delivery system 602, 702, 802, 902 and the platforms 610, 710, 810, 910 similar to the mechanisms described with respect to the energy delivery system 106 and the platform 102.

In addition, reflective members of the energy delivery systems 602, 702, 802, 902 can have features similar to those described herein with respect to the reflective member 118. For example, each of the reflective members is a polygonal mirror including facets as described with respect to FIG. 2.

Referring to FIG. 9A, the energy delivery system 602 of the additive manufacturing apparatus 600 includes a reflective member 604 and a light emitting system 606. The light emitting system 606 includes one or more light sources, e.g., lasers, to generate multiple light beams 608a, 608b. The light emitting system 606 could include a separate light source for each beam, or a common light source and a device such as a beam splitter.

The reflective member 604 receives the multiple light beams 608a, 608b from the light emitting system 606 and redirects the multiple light beams 608a, 608b toward the platform 610 on which the feed material is dispensed. The reflective member 604 is a common reflective member that receives each of the light beams 608a, 608b emitted by the light emitting system 606 and redirects each of the light beams 608a, 608b toward the feed material delivery area.

Similar to the reflective member 118, the reflective member 604 includes facets 609 that receive the light beams 608a, 608b and redirect the light beams 608a, 608b toward the feed material delivery area. When the reflective member 604 is rotated, both of the light beams 608a, 608b are swept across a particular facet. Continued rotation of the reflective member 604 enables the light beams 608a, 608b to be swept from one facet to another sequential facet, e.g., at the same time.

As shown in FIG. 9A, the angles of incidence of the light beams 608a, 608b on the facet of the reflective member 604 can differ such that the light beams 608a, 608b are redirected by the reflective member 604 to different portions of the uppermost layer of feed material. The light beams 608a, 608b can be incident on the reflective member 604 at substantially the same location along a facet. This ensures that the light beams 608a, 608b travel along the same facet in the same time period.

During operation of the additive manufacturing apparatus 600, after a layer of feed material has been dispensed on the platform 610, the energy delivery system 602 causes the light beam 608a to sweep along a path 612a on the uppermost layer of feed material dispensed on the platform 610 and causes the light beam 608b to sweep along a path 612b on the uppermost layer of feed material dispensed on the platform 610. The reflective member 604 is rotated such that the light beams 608a, 608b can be scanned in directions of travel 614a, 614b. The light beams 608a, 608b are swept in parallel directions of travel 614a, 614b that are at a non-zero angle to a direction of travel 616 of the paths 612a, 612b relative to the platform 610 (e.g., as caused by travel of the energy delivery system 602). The light beam 608a sweeps along the path 612a and the light beam 608b sweeps along the path 612b during traversal of the light beams 608a, 608b along a length of one of the facets 609 of the reflective member 604.

FIG. 9B shows portions of the paths 612a, 612b. As the reflective member 604 is rotated, both the light beams 608a, 608b are advanced along the path 612a, 612b. For example, the light beam 608a is advanced an increment of one voxel when the light beam 608b is advanced an increment of one voxel. The paths 612a, 612b are substantially parallel to one another, e.g., parallel to one another or forming at most an angle of 5 degrees with one or another. For example, the direction of travel 614a for the light beam 608a is parallel to the direction of travel 614b for the light beam 608b. The path 612a extends along a first portion of a width of the feed material delivery area on the platform 610, and the path 612b extends along a second portion of the width of the feed material delivery area.

The paths 612a, 612b may overlap along at least a portion of the lengths of the paths 612a, 612b and, together, can extend across an entire width of the feed material delivery area. For examples, the path 612a can overlap with the path 612b by at least 5% to 15% of a length of the path 612a. Assuming the light beams 608a, 608b can be modulated independently, the light beams 608a, 608b can be controlled so that they deliver energy to non-overlapping portions of 620a, 620b of the feed material delivery area.

Alternatively, the paths 612a, 612b do not overlap but cover, together, the entire width of the feed material delivery area. For example, the path 612a can extend across a first portion 620a of the feed material delivery area on the platform 610, and the path 612b can extend across a second portion 620b of the feed material delivery area that does not overlap with the first portion 620a.

The first and second portions 620a, 620b can correspond to distinct halves of the width of the feed material delivery area (the width direction is perpendicular to the direction of travel 616).

The energy delivery system 602 is configured to cause the light beams 608a, 608b cause the paths 612a, 612b to advance along a direction of travel 616 relative to the platform 610, such that energy can be delivered across the length of the platform 610. In this regard, the light beams 608a, 608b are swept along the uppermost layer of feed material in the form of a raster scan. A single actuator can be coupled to the energy delivery system 602 or the platform 610 to cause the energy delivery system 602 to move relative to the platform 610. Alternatively, the light beams 612a, 612b could be deflected by another reflector with an adjustable angle, e.g., a galvo-driven mirror, to cause the paths 612a, 612b advance along a direction of travel 616.

Each time the light beams 608a, 608b are swept across the entire length of a facet to deliver energy to a first portion of the feed material delivery area, the light beams 608a, 608b are advanced along the direction of motion 616 to be swept across a second portion of the feed material delivery area offset from the first portion along the direction of travel 616. For example, the reflective member 604 is movable along the direction of travel 616 to cause the light beams 608a, 608b to each traverse a sequence of parallel paths spaced apart along the direction of travel 616. The sequence of parallel paths traversed by the light beam 608a, in some cases, do not overlap with the sequence of parallel paths traversed by the light beam 608b. In other cases, the sequence of parallel paths for the light beams 608a, 608b overlap one another.

Referring to FIG. 10A, the energy delivery system 702 of the additive manufacturing apparatus 700 includes a reflective member 704 and a light emitting system 706. The light emitting system 706 differs from the light emitting system 606 in that the energy delivery system 702 is configured to cause the light beams 708a, 708b to sweep along paths 712a, 712b such that the incident location of the light beam 708a on the feed material delivery area lags behind the incident location of the light beam 708b.

The light beams 708a, 708b can be incident on the reflective member 704 at similar or substantially equal angles of incidence, e.g., identical angles of incidence. For example, the angles of incidence of the light beams 708a, 708b can be equal along a vertical plane extending parallel to a direction of travel 716 of the light emitting system 706, e.g., parallel to the X-axis.

The light beams 708a, 708b can be incident at different locations along the facet 709 of the reflective member 704. As a result, during operation of the additive manufacturing apparatus 700, after a layer of feed material has been dispensed on the platform 710, the light beam 708a tracks the path 712b of the light beam 708b as the light beam 708b is swept across the platform 710. In this regard, the light beam 708b first delivers energy to a portion of the uppermost layer of feed material and then the light beam 708a delivers energy to the same portion of the uppermost layer of feed material after the reflective member 704 has rotated a sufficient amount. The amount that the reflective member 704 rotates to cause the light beam 708a to be swept over a portion of the uppermost layer that the light beam 708b has already been swept over depends on a difference in locations along the facet 709 at which the light beams 708a, 708b are incident on the reflective member 704. For example, the location of the light beam 708a on the feed material delivery area can be offset from the location of the light beam 708b by one or more voxel in a direction opposite directions of travel 714a, 714b.

The light beams 708a, 708b are swept along similar paths 712a, 712b on an uppermost layer of feed material dispensed on the platform 710 when the light beams 708a, 708b traverse the length of a facet 709 of the reflective member 704. Each of the paths 712a, 712b can extend across an entire width of the feed material delivery area of the platform 710, e.g., along the Y-axis.

FIG. 10B shows portions of the paths 712a, 712b. As the reflective member 704 is rotated, both the light beams 708a, 708b are swept along the path 712a, 712b. For example, the light beam 708a is swept an increment of one voxel when the light beam 708b is swept an increment of one voxel. Similar to the paths 612a, 612b, the paths 712a, 712b are substantially parallel to one another, e.g., parallel to one another or forming at most an angle of 5 degrees with one or another.

The path 712a extends along a first portion of a width of the feed material delivery area on the platform 710, and the path 712b extends along a second portion of the feed material delivery area. The paths 712a, 712b may overlap along at least a portion of the lengths of the paths 712a, 712b and, together, can extend across an entire width of the platform 710. For example, the path 712a can extend across a first half of the platform 710, and the path 712b can extend across a second half of the platform 710. In some cases, the paths 712a, 712b both extend across the entire width of the platform 710.

The amount of time between the light beam 708a being swept over a portion of the uppermost layer and the light beam 708b being swept over the same portion can be between 1 ms and 300 ms. The light beams 708a, 708b can have different heating properties, e.g., to heat dispensed feed material at different rates or by different amounts. For example, if the light beam 708a lags behind the light beam 708b, the light beam 708b can heat the feed material, e.g., without melting the feed material. The light beam 708a can then add sufficient heat to melt the feed material. In this regard, the light beam 708b can have an intensity smaller than an intensity of the light beam 708a. In such cases, an intensity of the light beam 708a can be between 1.25 M and 6 M W/cm$^2$, while an intensity of the light beam 708b can be between 50K and 1 M W/cm$^2$. Such a configuration of the light beams 708a, 708b can enable gradual heating of the feed material, thereby improving the resolution of the object to be formed.

Alternatively, the light beam 708b can facilitate melting of the feed material, and the light beam 708a can facilitate gradual cooling of the feed material after the feed material has been melted. The light beam 708b can accordingly have an intensity greater than an intensity of the light beam 708a. For example, the light beam 708a can be between 25K and 500K W/cm$^2$, while an intensity of the light beam 708b can be between 1.25 M and 6 M W/cm$^2$. Gradual cooling of the feed material can improve the resolution of the object to be formed. The light beams 708a, 708b can scan across the feed material at the same scan speed.

Referring to FIG. 10A, the energy delivery system 702 of the additive manufacturing apparatus 700 includes a reflective member 704 and a light emitting system 706. The light emitting system 706 differs from the light emitting system 606 in that light beams 708a, 708b are swept along paths 712a, 712b such that the incident location on the feed material delivery area of the light beam 708a lags behind the incident location of the light beam 708b.

Figure 11B:
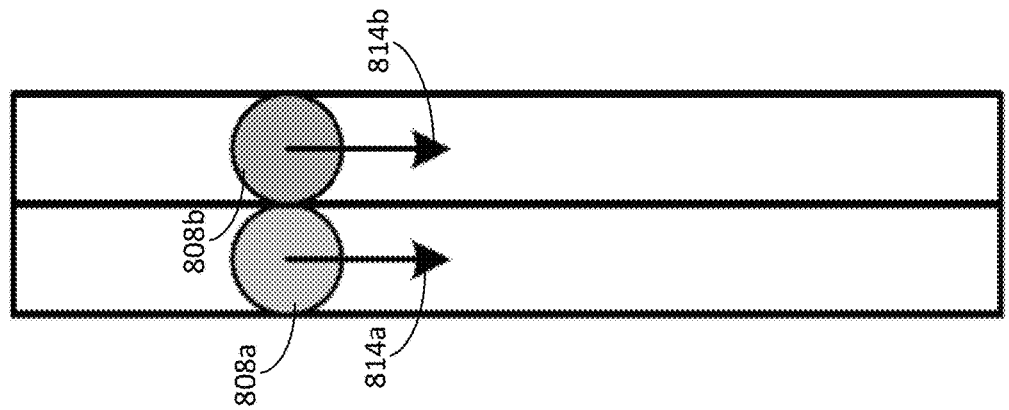
Figure 11A:
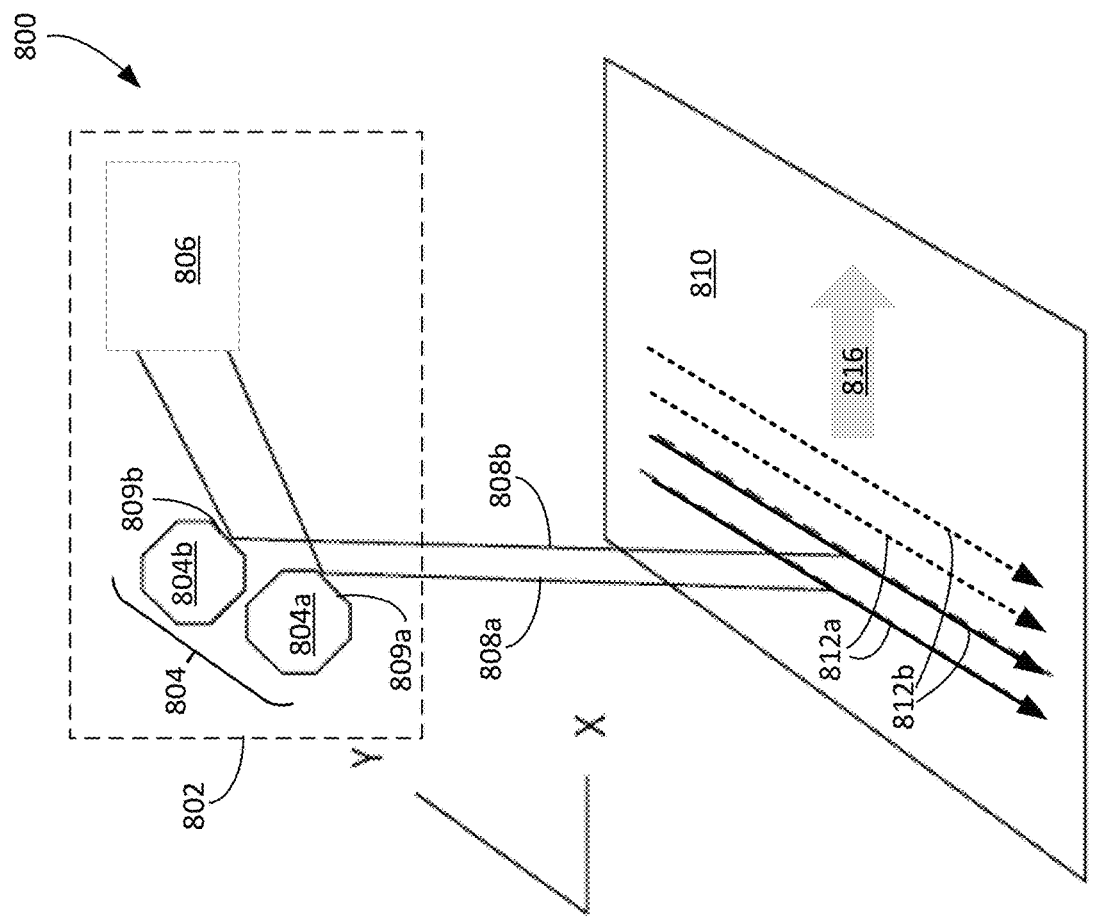

Referring to FIG. 11A, the energy delivery system 802 of the additive manufacturing apparatus 800 includes one or more reflective members 804 and a light emitting system 806. The light emitting system 806 emits multiple light beams 808a, 808b toward the one or more reflective members 804, which thereby redirects the light beams 808a, 808b toward the uppermost layer of feed material dispensed on the platform 810. The energy delivery system 802 differs from the energy delivery system 702 in that the energy delivery system 802 is configured to cause the light beams 808a, 808b to sweep along paths 812a, 812b that are disposed in an alternating pattern along the direction of motion 816.

In some implementations, the energy delivery system 802 can include multiple reflective members 804a, 804b. Each of the reflective members 804a, 804b is similar in structure to the reflective member 118. In this regard, facets 809a of the reflective member 804a redirect the light beam 808a toward a first portion of the uppermost layer of feed material, and facets 809b of the reflective member 804b redirect the light beam 808b toward a second portion of the uppermost layer of feed material. The facets 809a, 809b can each have lengths that enable the paths 812a, 812b of the light beams 808a, 808b to extend along an entire width of the feed material delivery area on the platform 810.

The reflective members 804a, 804b are positioned such that paths 812a, 812b of the light beams 808a, 808b are offset from one another along a direction of travel 816 of the energy delivery system 802 relative to the platform 810. For example, the reflective members 804a, 804b can be positioned such that the light beams 808a, 808b have different angles of incidence on the facets 809a, 809b of the reflective members 804a, 804b. In additional, the reflective members 804a, 804b can be offset relative to another along the X-axis. The paths 812a, 812b can be offset from one another in the direction of travel 816 by one or more voxels. The offset between the paths 812a, 812b can be a function of the difference in the angles of incidence between the light beams 808a, 808b on the reflective members 804a, 804b and the amount of X-axis offset between the reflective members 804a, 804b.

Alternatively, the energy delivery system 802 can include a single reflective member, and the offset of the paths 812a, 812b on the feed material delivery area can be provided by differening angle of incidence of one of the beams on the reflective member 804a. In this case, the light beams 808a, 808b can be incident on the same facet of the reflective member 804a.

The paths 812a, 812b of the light beams 808a, 808b can be parallel to one another. The light beams 808a, 808b can be incident on the facets 809a, 809b at similar locations along lengths of the facets 809a, 809b so that the light beams 808a, 808b are directed to similar locations along the X-axis during operation of the energy delivery system. In addition, if the facets 809a and 809b have the same length and the reflective members 804a, 804b are rotated at the same speed, the light beams 808a, 808b can be swept across the paths 812a, 812b in a similar period of time. For example, referring to FIG. 11B, during operation of the energy delivery system 802, the light beams 808a, 808b can be swept in parallel directions of travel 814a, 814b. In some cases, the light beams 808a, 808b are incident on the uppermost layer of feed material at locations adjacent to one another along the paths 812a, 812b, e.g., adjacent along the direction of travel 816 of the energy delivery system 802. For example, while the light beams 808a, 808b are swept along the directions of travel 814a, 814b, the light beams 808a, 808b are directed toward voxels adjacent to one another along the direction of travel 816.

The light beam 808a can lag relative to the light beam 808b, e.g., the light beam 808b is incident at a location offset from the light beam 808a in the direction of travel 816 of the energy delivery system 802.

In some implementations, after each light beam 808a, 808b sweeps along a respective path 812a, 812b, the light beams 808a, 808b are caused to sweep along paths new paths 812a, 812b that are offset in the direction of travel 816 from the original paths 812a, 812b by two or more voxels. The number of voxels of offset can be equal to the number of light beams. Said another way, the energy delivery system 802 is advanced such paths swept by the light beam 808a do not overlap with paths swept by the light beam 808b. In effect, the light beams 808a, 808b are swept along the uppermost layer of feed material in the form of an interlaced raster scan. This can increase throughput of the objects to be formed by the additive manufacturing apparatus.

To cause successive paths traced on the platform 810 to advance along the direction of motion 816, the energy delivery system 802 can advanced in the direction of travel 816 relative to the platform 810. An actuator can be coupled to the energy delivery system 802 or the platform 810 to cause the energy delivery system 802 to move relative to the platform 810. Alternatively, the light beams 808a, 808b could be deflected by another reflector, e.g., a galvo-driven mirror, and an angle of the reflector can be adjusted to cause the paths 812a, 812b advance along a direction of travel 816.

Referring to FIG. 12A, the energy delivery system 902 of the additive manufacturing apparatus 900 includes multiple reflective members 904a, 904b and a light emitting system 906. The energy delivery system 902 differs from the energy delivery system 802 in that light the light beam 908a is directed toward a first portion 920a of the feed material delivery area on the platform 910 while the light beam 908b is directed toward a second portion 920b of the feed material delivery area. For example, the energy delivery system 902 is controlled such that paths swept by the light beam 908a are restricted to the first portion 920a and paths swept by the light beam 908b are restricted to the second portion 920b. Each portion is a contiguous zone on the feed material delivery area. For example, the first and second portions 920a, 920b can correspond to distinct halves of the feed material delivery area, arranged along the length of the platen (i.e., along the direction of travel 916). More generally, for N light beams, the feed material delivery area can be divided into N contiguous zones occupying 1/N of the length of the platen.

The difference between the angles of incidence of the light beams 908a, 908b and the amount of offset along the X-axis between the reflective members 904a, 904b can be selected such that the light beam 908a is directed toward a first portion 920a of the feed material delivery area on the platform 910 while the light beam 908b is directed toward a second portion 920b of the feed material delivery area.

Referring to FIG. 12B, during operation of the energy delivery system 902, the light beams 908a, 908b can be swept in parallel directions of travel 914a, 914b. In some cases, the light beams 908a, 908b are incident on the uppermost layer of feed material at locations adjacent to one another along the paths 912a, 912b, e.g., adjacent along the direction of travel 916 of the energy delivery system 902. For example, while the light beams 908a, 908b are swept along the directions of travel 914a, 914b, the light beams 908a, 908b are directed toward voxels that are along the same axis parallel to the direction of travel 816, e.g., parallel to the Y-axis.

To cause successive paths 912a, 912b traced on the platform 910 to advance along the direction of motion 916, the energy delivery system 892 can advanced in the direction of travel 916 relative to the platform 910. An actuator can be coupled to the energy delivery system 902 or the platform 910 to cause the energy delivery system 902 to move relative to the platform 910. Alternatively, each light beams 908a, 908b could be deflected by another reflector, e.g., a galvo-driven mirror, and an angle of the reflector can be adjusted to cause the paths 912a, 912b advance along the direction of travel 816.

In some cases, the energy delivery systems 602, 702, 802, 902 emit multiple light beams received by the rotatable member or rotatable members. For example, the light emitting systems 602, 702, 802, 902 include multiple light sources, e.g., lasers, that direct multiple light beams toward the rotatable members. Alternatively, in some cases, the energy delivery systems 602, 702, 802, 902 include a single light source, and a beam splitter receives the light beam emitted by the light source. The beam splitter causes multiple light beams to be formed from the single light beam. These multiple light beams are directed toward the one or more rotatable members.

The energy delivery systems 602, 702, 802, 902 can move relative to the platforms 610, 710, 810, 910 through operation of one or more actuators. In some implementations, a single actuator is driven to cause such movement. In implementations in which a light emitting system includes multiple reflective members, the reflective members can be independently movable relative to the platform. For example, relative motion between a first reflective member and a platform can be generated through operation a first actuator, and relative motion between a second reflective member and a platform can be generated through operation a second actuator. Alternatively or additionally, the additive manufacturing apparatus 600, 700, 800, 900 include a conveyor similar to the conveyor 132 of the additive manufacturing apparatus 100. Operation of the conveyor generates the relative motion between the light emitting systems. In addition, reflective members of the additive manufacturing apparatus 600, 700, 800, 900 can be mounted relative to the platforms in manners similar to those described with respect to the additive manufacturing apparatus 300, 400, 500, thereby enabling additional modes of translation or rotation of support or supports for the reflective members.

In some implementations, the energy delivery systems 602, 702, 802, 902 include one or more beam expanders positioned to expand one or more of the light beams (e.g., light beams 608a, 608b, 708a, 708b, 808a, 808b, 908a, 908b). For example, a beam expander can expand a first light beam such that a spot of the first light beam on the uppermost layer of feed material is larger than a spot of a second light beam on the uppermost layer of feed material. The first light beam can cover a greater number of voxels than the second light beam. The first light beam can be used for heating the feed material while the second light beam is used for melting the feed material.

The energy delivery systems 602, 702, 802, 902 can each deliver energy to the uppermost layer of feed material in a staged manner to enable gradual increase in temperature of the feed material. In this regard, the multiple lasers allow for a two-stage temperature increase. In some implementations, energy is added in a three or more stage process in which a bulk energy delivery system (e.g., similar to the bulk energy delivery system 134) delivers energy in a first stage, and then each of the multiple lasers delivers energy in subsequent stages.

Example Patterns of Light Beam Coverage

The additive manufacturing apparatuses described herein, e.g., the additive manufacturing apparatuses 100, 200, 300, 400, 500 600, 700, 800, 900, can execute processes to generate various light beam coverage patterns. Referring to FIG. 13A, a process 1000 includes an operation 1002 in which contours defining a perimeter of an object 1010 in a layer (as opposed to voxels in the interior of the object in a layer) are formed. If the second energy delivery system 204 described with respect to FIGS. 6A, 6B, and 7 is present, the second energy delivery system 204 can sweep a light beam across a two-dimensional vector path to cure the feed material corresponding to one of the contours, e.g., one of the inner and outer contours. The data defining the pattern of light beam coverage can define the vector path across which the light beam is swept. The second energy delivery system 204 can sweep the light beam across another two-dimensional vector path to cure the feed material corresponding to the other of the contours, e.g., the other of the inner and outer contours.

Referring to FIGS. 13A-13D, the set of operations 1004A, 1006A, 1008A (FIG. 13A) can be performed, the set of operations 1004B, 1006B, 1008B (FIG. 13B) can be performed, the set of operations 1004C, 1006C, 1008C (FIG. 13C), or the set of operations 1004D, 1006D, 1008D can be performed to fuse an interior of the object 1010, e.g., the area bounded by the contours formed at operation 1002. The operation 1002 combined with the set of operations 1004A, 1006A, 1008A, the set of operations 1004B, 1006B, 1008B, or the set of operations 1004C, 1006C, 1008C enables the object 1010 to be formed.

Referring to FIG. 13A, at operation 1004A, the light beam from the energy delivery system is directed along parallel horizontal rows of an uppermost layer of feed material. The horizontal rows extend along the Y-axis. The swept paths of the light beam are continuous and span across an entire width of the region of the feed material delivery area. For example, the reflective member of the energy delivery system is continuously rotated, and the light source is continuously activated to form one of the horizontal rows.

The horizontal rows are separated from one another by regions to which the light beam is not directed. In this regard, as the support to which the energy delivery system is mounted is advanced along the X-axis, the energy delivery system is selectively operated to sweep the light beam along paths separated from one another. In some cases, the support is advanced in sufficiently large increments to enable such separation between the swept paths.

Alternatively, the energy delivery system is activated only during selected incremental positions of the support, each increment corresponding to a single voxel of feed material. During other incremental positions, the reflective member is continuously rotated, but the light source does not emit the light beam.

At operation 1006A, the light beam from the energy delivery system is directed along parallel horizontal rows extending along the X-axis. The horizontal rows are separated from one another by regions to which the light beam is not directed. As the reflective member continuously rotates, the light source is selectively activated such that portions of the uppermost layer of feed material that receive the light beam are separated by portions that do not receive the light beam. The light source is, for example, pulsed while the reflective member 118 is continuously rotated such that energy is delivered to a discontinuous set of voxels extending along the X-axis. In alternative examples, if the support for the energy delivery system is rotatable relative to the platform, the support can be reoriented such that the energy delivery system can cause the light beam to sweep such horizontal rows extending along the X-axis.

At operation 1008A, the light beam from the energy delivery system is directed along parallel horizontal rows extending along the Y-axis. The horizontal rows of the operation 1008A are offset from the horizontal rows of operation 1004A but can be formed with similar operation of the energy delivery system and the support.

Referring to FIG. 13B, operations 1004B, 1006B, and 1008B differ from operations 1004A, 1006A, 1008A in that the horizontal rows formed in operations 1004B and 1008B are at non-zero angles relative to the Y-axis and the horizontal rows formed in operation 1006B are at non-zero angles relative to the X-axis. In some implementations, the horizontal rows formed in operations 1004B and 1008B are formed in a manner similar to formation process for the horizontal rows for operation 1006C. In particular, the reflective member is rotatable to sweep the light beam along a horizontal path parallel to the Y-axis, but the light source is selectively activated to form angled horizontal rows with at least one voxel of unfused feed material. Alternatively, as described with respect to the support 122 of the additive manufacturing apparatus 100, paths of the light beam delivered by the energy delivery system 106 can be reoriented relative to the Y-axis such that the paths form non-zero angles relative to the Y-axis. In this regard, the horizontal rows formed in operations 1004B and 1008B can be angled through rotation of the support to which the energy delivery system 106 is mounted.

Similarly, the horizontal rows in operation 1006B can be generated through selective operation of the energy delivery system. The energy delivery system can have the same orientation as it had for operations 1004B and 1008B. Alternatively, at operation 1006B, the energy delivery system can be reoriented, e.g., through rotation of the support to which the energy delivery system is mounted.

Referring to FIG. 13C, in some implementations, sectors of the interior of the object 1010 are fused sequentially. At operation 1004C, a first sector is fused by sweeping the light beam through horizontal rows. While depicted as horizontal rows angled relative to both the X-axis and Y-axis, the rows can be horizontal rows at any appropriate angle. At operation 1006C, a second sector is fused by sweeping through horizontal rows. The horizontal rows of operation 1006C can have angles similar to the angles of the horizontal rows of operation 1004C.

To allow the first sector fused at operation 1004C to cool, the second sector fused at operation 1006C can be separated from the first sector, e.g., by a third sector to be used at operation 1008C. For example, edges defining the first sector can be separated from edges defining the second sector. This separation can provide time for the first sector to cool after fusing. Rather than continuing to deliver energy to portions adjacent to the first sector, at operation 1006C, energy is delivered to the non-adjacent second sector. Then, at operation 1008C, the third sector separating the first and second sectors can be fused.

Referring to FIG. 13D, in some implementations, multiple energy delivery systems are operated to perform operations 1004D, 1006D, and 1008D, e.g., in accordance implementations described with respect to the additive manufacturing apparatuses 300, 400, 500. A feed material delivery area 1012 to which feed material is delivered is divided into distinct regions 1014a-1014d. The patterns shown in FIG. 13D for operations 1004D, 1006D, 1008D are similar to the patterns shown in FIG. 13A for operations 1004A, 1006A, 1008A. However, for operations 1004D, 1006D, 1008D, multiple energy delivery systems are operated to deliver energy to the different regions 1014a-1014d. If two energy delivery systems are present, a first of the energy delivery systems sweeps the light beam along horizontal rows in the region 1014a and along horizontal rows in the region 1014b for operations 1004D, 1006D, 1008D, and a second of the energy delivery systems sweeps the light beam along horizontal rows in the region 1014c and along horizontal rows in the region 1014d for operations 1004D, 1006D, and 1008D.

In some implementations, the first energy delivery system sweeps the light beam along the horizontal rows in the region 1014b while the second energy delivery system sweeps the light beam along the horizontal rows in the region 1014c. The first energy delivery system then sweeps the light beam along the horizontal rows in the region 1014a while the second energy delivery system sweeps the light beam along the horizontal rows in the region 1014d. Because the regions 1014b, 1014c have non-overlapping edges and the regions 1014a, 1014d have non-overlapping edges, such a sequence of fusing the feed material can reduce heat build-up that can occur as a result of simultaneously fusing feed material in adjacent regions.

Other patterns of light beam coverage are possible. For example, referring to FIG. 14, similar to the implementations described with respect to FIG. 13D, a feed material delivery area 1112 is divided into regions 1114a-1114d so that multiple energy delivery systems can selectively and sequentially sweep light beams through the regions 1114a-1114d. In contrast to the processes described with respect to FIGS. 13A-13D, in process 1100, multiple sets of contours of an object 1110 are formed, with one set of the contours defining a first interior portion 1116a and another set of the contours defining a second interior portion 1116b. As shown in operation 1102, in a manner similar to that described for operation 1102, the contours can be fused. The interior portions 1116a, 1116b can then be fused at operations 1104, 1106, 1108 to form the object 1110. As shown in operation 1104. Within a single region 1114a, 1114b, 1114c, or 1114d, an energy delivery system can selective emit the light beam to generate a pattern of fused material including first horizontal rows and second horizontal rows at a non-zero angle relative to the first horizontal rows. The multiple energy delivery systems can each be operated in such a manner such that each of the regions 1114a-1114d can have similar patterns. Furthermore, the energy delivery systems can deliver energy to the interior portion 1116a to form third horizontal rows at a non-zero angle relative to the horizontal rows of the interior portion 1116b, e.g., both the first horizontal rows and the second horizontal rows.

ALTERNATIVE IMPLEMENTATIONS

Controllers and computing devices can implement these operations and other processes and operations described herein. As described above, the controller 108 of the apparatus 100 can include one or more processing devices connected to the various components, systems, and subsystems of the apparatus 100. The controller 108 can coordinate the operation and cause the apparatus 100 to carry out the various functional operations or sequence of steps described above. The controller 108 can control the movement and operations of the systems of the printhead 126.

The controller 108 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 108 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 108, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy delivery systems mounted to supports independent from supports for the dispensers.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

A number of implementations have been described. Nevertheless, it will be understood that various modifications may be made. For example, Various components described above as being part of the printhead, such as the dispensing system(s), spreader (s), sensing system(s), heat source and/or energy source, can be mounted on the gantry instead of in the printhead, or be mounted on the frame that supports the gantry.

The platform can have width between 200 mm and 2000 mm, e.g., between 500 mm and 1000 mm, about 400 mm, about 500 mm, about 600 mm, about 700 mm, etc.

The region to be covered by a single energy delivery system can span a width between 100 mm to 1000 mm, e.g., between 250 mm and 500 mm, about 200 mm, about 250 mm, about 300 mm, etc.

The energy delivery systems can be advanced incrementally along the Y-axis so that the light beam can be delivered across an entire length of the platform. In some cases, an energy delivery system is advanced an increment at the end of a single path across a platform. A light source can be controlled such that the light beam is not emitted when the energy delivery system is being advanced, for example, as the predicted location of the light beam incident on the reflective member moves from one facet to another facet.

Accordingly, other implementations are within the scope of the claims.

What is claimed is:

1. An additive manufacturing apparatus comprising:
a platform to support an object being fabricated;
a dispenser to dispense a plurality of layers of feed material on a top surface of the platform; and
an energy delivery system comprising
one or more light sources configured to emit a first light beam and a second light beam,
one or more polygon beam scanners each including a rotatable mirror to provide one or more rotatable mirrors, the one or more rotatable mirrors having a multiplicity of reflective facets to redirect the first light beam and the second light beam toward the platform to deliver energy to an uppermost layer of feed material, with each of the one or more rotatable mirrors having a plurality of reflective facets, the one or more rotatable mirrors being positioned and rotatable such that motion of the multiplicity of reflective facets causes a first spot of impingement of the first light beam on the uppermost layer to sweep along a first path on the uppermost layer and causes a second spot of impingement of the second light beam to sweep along a different second path on the uppermost layer, wherein the first path and the second path are linear and extend in a same scanning direction and are offset along the scanning direction such that and wherein the first path extends along a first portion of a width of the uppermost layer of feed material in the scanning direction and the second path extends along a different second portion of the width of the uppermost layer of feed material in the scanning direction.

2. The additive manufacturing apparatus of claim 1, wherein the one or more rotatable mirrors comprises a common rotatable mirror to receive the first light beam and the second light beam, the one or more rotatable mirrors positioned and configured such that motion of each sequential facet of the plurality of reflective facets of the common rotatable mirror sweeps the first spot of impingement of the first light beam along the first path and sweeps the second spot of impingement of the second light beam along the second path.

3. The apparatus of claim 2, wherein the common rotatable mirror is positioned and configured such that the first light beam and the second light beam impinge a common facet of the plurality of facets.

4. The apparatus of claim 3, wherein the common rotatable mirror is positioned and configured such the first light beam and the second light beam impinge the common facet at different angles of incidence.

5. The apparatus of claim 2, wherein the common rotatable mirror is positioned and configured such the first light beam is received at a first reflective facet when the second light beam is received at a second reflective facet.

6. The apparatus of claim 1, wherein the one or more polygon beam scanners comprise a first polygon beam scanner including a first rotatable mirror having a first plurality of reflective facets to receive the first light beam and a second polygon beam scanner including a second rotatable mirror having a second plurality of reflective facets to receive the second light beam, wherein the first rotatable mirror is rotatable such that motion of each sequential facet of the first plurality of reflective facets sweeps the first spot of impingement of the first light beam along the first path, and wherein the second rotatable mirror is rotatable such motion of each sequential facet of reflective facets of the second plurality of reflective facets sweeps the second spot of impingement of the second light beam along the second path.

7. The apparatus of claim 1, wherein the first path and the second path are collinear.

8. The apparatus of claim 7, wherein the first path and the second path are partially overlapping along the scanning direction.

9. The apparatus of claim 8, wherein the first path overlaps the second path by 5% to 15% of a length of the first path.

10. An additive manufacturing apparatus comprising:
a platform to support an object being fabricated;
a dispenser to dispense a plurality of layers of feed material on a top surface of the platform;
an energy delivery system comprising
one or more light sources configured to emit a first light beam and a second light beam, and
one or more polygon beam scanners each including a rotatable mirror to provide one or more rotatable mirrors, the one or more rotatable mirrors having a multiplicity of reflective facets to redirect the first light beam and the second light beam toward the platform to deliver energy to an uppermost layer of feed material, with each of the one or more rotatable mirrors having a plurality of reflective facets, the one or more rotatable mirrors being positioned and rotatable such that motion of the multiplicity of reflective facets causes a first spot of impingement of the first light beam on the uppermost layer to sweep along a first path on the uppermost layer and causes a second spot of impingement of the second light beam to sweep along a different second path on the uppermost layer, wherein the first path and the second path each extend along an entire width of the uppermost layer of feed material, and wherein the first path and the second path are offset from one another along a horizontal direction perpendicular to the first path and second path another by at least half of a length of the uppermost layer; and
a support movable relative to the platform along a horizontal axis that is at a non-zero angle relative to the first path and the second path, and wherein the one or more polygon beam scanners are mounted to the support such that motion of the support along the horizontal axis causes a sequence of sweeps along the first path by the first spot of impingement of first light beam to create a raster scan of the first spot of impingement of the first light beam across a first area on the uppermost layer and a sequence of sweeps along the second path by the second light beam to create a raster scan of the second spot of impingement of the second light beam across a second area on the uppermost layer.

11. The apparatus of any of claim 10, wherein the first path and the second path are linear.

12. The apparatus of claim 1, comprising a support movable relative to the platform along a horizontal axis that is at a non-zero angle relative to the first path and the second path, and wherein the one or more polygon beam scanners are mounted to the support such that motion of the support along the horizontal axis causes a sequence of sweeps along the first path by the first spot of impingement of the first light beam to create a raster scan of the first spot of impingement of the first light beam across a first area on the uppermost layer and a sequence of sweeps along the second path by the second light beam to create a raster scan of the second spot of impingement of the second light beam across a second area on the uppermost layer.

13. The apparatus of claim 12, wherein the horizontal axis is perpendicular to the first path.

14. An additive manufacturing apparatus comprising:
a platform;
a dispenser to dispense a plurality of layers of feed material on a top surface of the platform; and
an energy delivery system comprising
one or more light sources configured to emit a first light beam and a second light beam, and
a reflective member having a multiplicity of reflective facets to redirect the first light beam and the second light beam toward an uppermost layer of feed material to deliver energy to the uppermost layer, the reflective member being rotatable such that motion of the multiplicity of facets sweeps a first spot of impingement of the first light beam along a first path on the uppermost layer and sweeps a second spot of impingement of the second light beam along a second path on the uppermost layer in a same build area of the platform, wherein the first light beam and the second light beam impinge a common facet of the multiplicity of facets at different angles of incidence or the first light beam is received at a first reflective facet when the second light beam is received at a second reflective facet.

15. The apparatus of claim 14, comprising a support movable relative to the platform along a horizontal axis that is at a non-zero angle relative to the first path and the second path, and the reflective member is mounted to the support such that motion of the support along the horizontal axis causes a sequence of sweeps along the first path by the first spot of impingement of the first light beam to create a raster scan of the first spot of impingement of the first light beam across a first area on the uppermost layer and a sequence of sweeps along the second path by the second light beam to create a raster scan of the second spot of impingement of the second light beam across a second area on the uppermost layer.

16. The apparatus of claim 15, wherein the horizontal axis is perpendicular to the first path.

17. The apparatus of claim 10, wherein the horizontal axis is perpendicular to the first path.

18. The apparatus of claim 1, wherein the first path and the second path are non-overlapping along the scanning direction.

19. The apparatus of claim 1, comprising an actuator to generate relative motion between the platform and the one or more polygon beam scanners such that the relative motion causes a sequence of sweeps along the first path by the first spot of impingement of the first light beam to create a raster scan of the first spot of impingement of the first light beam across a first area on the uppermost layer and a sequence of sweeps along the second path by the second light beam to create a raster scan of the second spot of impingement of the second light beam across a second area on the uppermost layer.

* * * * *

UNITED STATES PATENT AND TRADEMARK OFFICE
CERTIFICATE OF CORRECTION

| | |
|---|---|
| PATENT NO. | : 10,940,641 B2 |
| APPLICATION NO. | : 15/960478 |
| DATED | : March 9, 2021 |
| INVENTOR(S) | : Jeffrey L. Franklin, Hou T. Ng and Nag B. Patibandla |

Page 1 of 1

It is certified that error appears in the above-identified patent and that said Letters Patent is hereby corrected as shown below:

In the Claims

Column 26, Line 32, in Claim 10, delete "of first" and insert -- of the first -- therefor.

Column 26, Line 39, in Claim 11, before "claim" delete "any of".

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*